US010178660B2

United States Patent
Lee et al.

(10) Patent No.: US 10,178,660 B2
(45) Date of Patent: Jan. 8, 2019

(54) APPARATUS AND METHOD FOR TRANSMITTING/RECEIVING DOWNLINK DATA CHANNEL SIGNAL TRANSMISSION INFORMATION IN CELLULAR RADIO COMMUNICATION SYSTEM USING COOPERATIVE MULTI-POINT SCHEME

(71) Applicant: Samsung Electronics Co., Ltd., Suwon-si, Gyeonggi-do (KR)

(72) Inventors: Hyo-Jin Lee, Suwon-si (KR); Youn-Sun Kim, Seongnam-si (KR); Ki-Il Kim, Yongin-si (KR); Hyoung-Ju Ji, Seoul (KR); Joon-Young Cho, Suwon-si (KR); Ju-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/589,457

(22) Filed: May 8, 2017

(65) Prior Publication Data

US 2017/0245253 A1    Aug. 24, 2017

Related U.S. Application Data

(63) Continuation of application No. 14/873,772, filed on Oct. 2, 2015, now Pat. No. 9,648,605, which is a (Continued)

(30) Foreign Application Priority Data

Jan. 11, 2012    (KR) .................. 10-2012-0003435
Feb. 7, 2012     (KR) .................. 10-2012-0012557
(Continued)

(51) Int. Cl.
*H04W 72/04*   (2009.01)
*H04L 5/00*    (2006.01)

(52) U.S. Cl.
CPC .......... *H04W 72/042* (2013.01); *H04L 5/003* (2013.01); *H04L 5/0007* (2013.01);
(Continued)

(58) Field of Classification Search
CPC ..... H04W 16/02; H04W 16/10; H04W 16/12; H04W 72/00; H04W 72/04
See application file for complete search history.

(56) References Cited

U.S. PATENT DOCUMENTS 8,427,976 B1 *  4/2013  Dinan ............... H04W 36/0072
                                                        370/252
8,937,897 B2    1/2015  Hoshino et al.
(Continued)

FOREIGN PATENT DOCUMENTS

CN    102 047 626 A    5/2011
CN    102 273 125 A    12/2011
(Continued)

OTHER PUBLICATIONS

"Downlink Control Signalling for CoMP," R1-114229, 3GPP TSG RAN WG1 #67, San Francisco, USA, Nov. 14-18, 2011.
(Continued)

*Primary Examiner* — Christopher M Brandt
(74) *Attorney, Agent, or Firm* — Jefferson IP Law, LLP

(57) ABSTRACT

An apparatus and a method for transmitting/receiving downlink data channel signal transmission information in a cellular radio communication system using a Cooperative Multi-Point (CoMP) scheme are provided. In the downlink data channel signal transmission information transmission method, a Base Station (BS) transmits downlink data channel signal transmission information including information
(Continued)

related to Resource Elements (REs) scheduled for a downlink data channel signal transmission to a User Equipment (UE), and transmits downlink data channel signal non-transmission information including information related to REs through which a downlink data channel signal is not transmitted among the REs scheduled for the downlink data channel signal transmission to the UE.

16 Claims, 17 Drawing Sheets

Related U.S. Application Data continuation of application No. 13/740,008, filed on Jan. 11, 2013, now Pat. No. 9,516,632.

(60) Provisional application No. 61/600,192, filed on Feb. 17, 2012, provisional application No. 61/602,741, filed on Feb. 24, 2012, provisional application No. 61/623,768, filed on Apr. 13, 2012, provisional application No. 61/625,252, filed on Apr. 17, 2012, provisional application No. 61/662,534, filed on Jun. 21, 2012.

(30) Foreign Application Priority Data

Mar. 14, 2012 (KR) ......... 10-2012-0026248
Aug. 24, 2012 (KR) ......... 10-2012-0093328

(52) U.S. Cl.
CPC .......... *H04L 5/0035* (2013.01); *H04L 5/0048* (2013.01); *H04L 5/0073* (2013.01); *H04W 72/04* (2013.01)

(56) References Cited

U.S. PATENT DOCUMENTS

| | | | |
|---|---|---|---|
| 2007/0242764 A1* | 10/2007 | Anigstein | H04L 5/0007 375/260 |
| 2010/0103834 A1 | 4/2010 | Gorokhov et al. | |
| 2010/0177746 A1 | 7/2010 | Gorokhov et al. | |
| 2010/0189038 A1 | 7/2010 | Chen et al. | |
| 2010/0238821 A1 | 9/2010 | Liu et al. | |
| 2010/0329170 A1 | 12/2010 | Wu | |
| 2011/0170422 A1 | 7/2011 | Hu et al. | |
| 2011/0218016 A1 | 9/2011 | Hirakawa et al. | |
| 2011/0244877 A1 | 10/2011 | Farajidana et al. | |
| 2011/0255508 A1 | 10/2011 | Iwamura et al. | |
| 2012/0033603 A1* | 2/2012 | Seo | H04L 5/001 370/312 |
| 2012/0163305 A1 | 6/2012 | Nimbalker et al. | |
| 2012/0176884 A1* | 7/2012 | Zhang | H04B 7/024 370/203 |
| 2012/0182946 A1 | 7/2012 | Chen et al. | |
| 2012/0230245 A1 | 9/2012 | Ostergaard et al. | |
| 2013/0039284 A1* | 2/2013 | Marinier | H04L 5/001 370/329 |
| 2013/0058296 A1 | 3/2013 | Jitsukawa | |
| 2013/0136095 A1 | 5/2013 | Nishio et al. | |
| 2013/0155921 A1* | 6/2013 | Gomadam | H04K 1/02 370/310 |
| 2013/0163530 A1 | 6/2013 | Chen et al. | |
| 2013/0176952 A1* | 7/2013 | Shin | H04L 5/001 370/329 |
| 2013/0223402 A1 | 8/2013 | Feng et al. | |
| 2014/0247775 A1* | 9/2014 | Frenne | H04L 5/0048 370/329 |
| 2015/0139079 A1* | 5/2015 | Zhu | H04N 21/2365 370/329 |

FOREIGN PATENT DOCUMENTS

| | | |
|---|---|---|
| KR | 10-2011-0091661 A | 8/2011 |
| WO | 2011/021852 A2 | 2/2011 |
| WO | 2011-044530 A2 | 4/2011 |
| WO | 2011-135614 A1 | 11/2011 |

OTHER PUBLICATIONS

"Downlink control signaling for CoMP," R1-113764, 3GPP TSG RAN WG1 #67, San Francisco, USA, Nov. 14-18, 2011.
"Downlink control signaling for CoMP," R1-113895, 3GPP TSG RAN WG1 #67, San Francisco, USA, Nov. 14-18, 2011.
"PDSCH mapping/CRS pattern indication for multi-cell JP CoMP," R1-113956, 3GPP TSG RAN WG1 #67, San Francisco, USA, Nov. 14-18, 2011.
"On downlink control signaling of CoMP," R1-113734, 3GPP TSG RAN WG1 #67, San Francisco, USA, Nov. 14-18, 2011.
TS 36.211 v10.1.0, "E-Utra, Physical channels and modulation." pp. 1-104, Apr. 2011.
3GPP TS 36.213 v10.1.0, "E-UTRA, Physical Layer Procedures." pp. 1-116 Apr. 2011.
3GPP TS 36.212 v10.1.0, "E-UTRA, Multiplexing and Channel coding." pp. 1-62, Jun. 2010.
"Signalling requirements for PDSCH mapping for DLCoMP", Huawei, HiSilicon, R1-113645, 3GPP TSG-RAN WG1#67, Nov. 14-18, 2011.
"PDSCH RE Mapping for CoMP among Multiple Cells", Samsung, R1-121633, 3GPP TSG-RAN WG1#68bis, Mar. 26-30, 2012.
ETRI, Downlink control signaling for downlink CoMP, 3GPP TSG RAN WG1 Meetingt #66bis, R1-113555, Zhuhai, China, pp. 1-3, Oct. 10-14, 2011.
NEC Group, Remaining Issues of PCFICH, 3GPP TSG-RAN WG1 Meeting #61bis, R1-103825, Jun. 28-Jul. 2, 2010, pp. 1-6, Dresden, Germany.
Korean Office Action with English translation dated Nov. 9, 2018; Korean Patent Appln. No. 10-2013-0003565.

* cited by examiner

APPARATUS AND METHOD FOR TRANSMITTING/RECEIVING DOWNLINK DATA CHANNEL SIGNAL TRANSMISSION INFORMATION IN CELLULAR RADIO COMMUNICATION SYSTEM USING COOPERATIVE MULTI-POINT SCHEME

CROSS-REFERENCE TO RELATED APPLICATIONS

This application is a continuation application of prior application Ser. No. 14/873,772, filed on Oct. 2, 2015 which is a continuation application of prior application Ser. No. 13/740,008, filed on Jan. 11, 2013, which has issued as U.S. Pat. No. 9,516,632, and which claimed the benefit under 35 U.S.C. § 119(e) of a United States Provisional Application filed in the United States Patent and Trademark Office on Feb. 17, 2012 and assigned Ser. No. 61/600,192, a United States Provisional Application filed in the United States Patent and Trademark Office on Feb. 24, 2012 and assigned Ser. No. 61/602,741, a United States Provisional Application filed in the United States Patent and Trademark Office on Apr. 13, 2012 and assigned Ser. No. 61/623,768, a United States Provisional Application filed in the United States Patent and Trademark Office on Apr. 17, 2012 and assigned Ser. No. 61/625,252, and a United States Provisional Application filed in the United States Patent and Trademark Office on Jun. 21, 2012 and assigned Ser. No. 61/662,534, and the benefit under 35 U.S.C. § 119(a) of a Korean patent application filed on Jan. 11, 2012 in the Korean Intellectual Property Office and assigned Serial No. 10-2012-0003435, a Korean patent application filed in the Korean Intellectual Property Office on Feb. 7, 2012 and assigned Serial No. 10-2012-0012557, a Korean patent application filed in the Korean Intellectual Property Office on Mar. 14, 2012 and assigned Serial No. 10-2012-0026248, and a Korean patent application filed in the Korean Intellectual Property Office on Aug. 24, 2012 and assigned Serial No. 10-2012-0093328, the entire disclosure of each of which is incorporated herein by reference.

BACKGROUND OF THE INVENTION

1. Field of the Invention

The present invention relates to an apparatus and method for transmitting/receiving downlink data channel signal transmission information in a cellular radio communication system. More particularly, the present invention relates to an apparatus and method for transmitting/receiving downlink data channel signal transmission information in a Cooperative Multi-Point (CoMP) cellular radio communication system in which a plurality of Base Stations (BSs) provide a Mobile Station (MS) with a service using a CoMP scheme.

2. Description of the Related Art

A cellular radio communication system has evolved to provide various high-speed large-capacity services to Mobile Stations (MSs). Examples of the cellular radio communication system include a High Speed Downlink Packet Access (HSDPA) mobile communication system, a High Speed Uplink Packet Access (HSUPA) mobile communication system, a Long-Term Evolution (LTE) mobile communication system, a LTE-Advanced (LTE-A) mobile communication system, a High Rate Packet Data (HRPD) mobile communication system proposed in a 3rd Generation Project Partnership 2 (3GPP2), and an Institute of Electrical and Electronics Engineers (IEEE) 802.16m mobile communication system.

The LTE mobile communication system has been developed to effectively support a high-speed radio packet data transmission, and may maximize a throughput of a cellular radio communication system using various Radio Access (RA) schemes. The LTE-A mobile communication system enhances the LTE mobile communication system, and has an enhanced transmission capability compared with the LTE mobile communication system.

A 3rd Generation (3G) radio packet data communication system of the related art such as the HSDPA mobile communication system, the HSUPA mobile communication system and the HRPD mobile communication system uses schemes such as an Adaptive Modulation and Coding (AMC) scheme and a channel adaptation scheduling scheme in order to enhance a transmission efficiency. Upon using the AMC scheme and the channel adaptation-scheduling scheme, a signal transmission apparatus may use an optimal modulation scheme and coding scheme at the most efficient time point by receiving partial channel status feedback information from a signal reception apparatus.

In a radio packet data communication system using the AMC scheme, a signal transmission apparatus may adjust an amount of data packets to be transmitted according to channel status. That is, if the channel status is bad, the signal transmission apparatus may keep a reception error probability in a target reception error probability which the signal transmission apparatus targets by decreasing the amount of data packets to be transmitted. On the other hand, if the channel status is good, the signal transmission apparatus may keep the reception error probability in the target reception error probability and effectively transmit many data packets by increasing the amount of data packets to be transmitted.

In a radio packet data communication system using the channel adaptation-scheduling scheme, the signal transmission apparatus selects an MS having good channel status among a plurality of MSs, and provides the selected MS with a service. So, a system throughput increases compared with a case where the signal transmission apparatus allocates a channel to an arbitrary MS, and provides the arbitrary MS with the service. Such system throughput increase is referred to as a 'multi-user diversity gain'.

If the AMC scheme is used with a Multiple Input Multiple Output (MIMO) scheme, the AMC scheme may include a function for determining the number of spatial layers or a rank. In this case, the radio packet data communication system using the AMC scheme considers the number of layers to which a packet data is transmitted using the MIMO scheme as well as a code rate and a modulation scheme in order to determine an optimal data rate.

Generally, if an Orthogonal Frequency Division Multiple Access (OFDMA) scheme is used, a system throughput increase is expected compared with a case in which a Code Division Multiple Access (CDMA) scheme is used.

The reason why the system throughput is increased if the OFDMA scheme is used is that a radio packet data communication system may perform a frequency domain-scheduling scheme. The radio packet data communication system may acquire more throughput gains upon using a characteristic of which a channel status is varied according to a frequency like a case in which the radio packet data communication system acquires a throughput gain using the channel adaptation-scheduling scheme according to a characteristic of which a channel status is varied according to time. So, for a next generation cellular radio communication system, research is performed for changing the CDMA scheme used in a 2nd Generation (2G) cellular radio communication system and a 3G cellular radio communication system to the OFDMA scheme. The 3GPP and the 3GPP2 have started a standards project related to an enhanced cellular radio communication system using the OFDMA scheme.

FIG. 1 schematically illustrates a structure of a radio frame according to an LTE-A mobile communication system according to the related art.

Referring to FIG. 1, 1 radio frame includes 10 sub-frames, and each of 10 sub-frames includes 2 slots. So, indexes 0 to 9 are allocated to 10 sub-frames included in 1 radio frame, and indexes 0 to 19 are allocated to 20 slots included in 1 sub-frame.

FIG. 2 schematically illustrates a structure of a cellular radio communication system according to the related art.

In a cellular radio communication system in FIG. 2, a transmission/reception antenna is arranged at a center in each cell.

Referring to FIG. 2, in a cellular radio communication system including a plurality of cells, a particular User Equipment (UE) receives a radio communication service using a plurality of schemes as described above from a selected cell during a relatively long time, i.e., a semi-static time interval. For example, it will be assumed that the cellular radio communication system includes 3 cells, i.e., a cell 100, a cell 110 and a cell 120. The cell 100 provides a radio communication service to a UE 101 and a UE 102, the cell 110 provides a radio communication service to a UE 111, and the cell 120 provides a radio communication service to a UE 121. Base Stations (BSs) 130, 131 and 132 manage the cell 100, the cell 110 and the cell 120, respectively.

The UE 102 receiving the radio communication service using the cell 100 is located at a point relatively distant from the BS 130 compared with the UE 101. The UE 102 suffers from a relatively large interference from the BS 132 managing a service region of the cell 120, so the UE 102 receives data at a relatively slow data rate.

If the cells 100, 110 and 120 independently provide a radio communication service, a BS managing a service region of each of the cells 100, 110 and 120 transmits a Reference Signal (RS) so that a particular UE measures a downlink channel status of each of the cells 100, 110 and 120. If the cellular radio communication system is a 3GPP LTE-A mobile communication system, the RS is a Cell-Specific Reference Signal (CRS) or a Channel Status Information Reference Signal (CSI-RS).

Meanwhile, in a 3GPP LTE-A mobile communication system, a UE measures a channel status between a BS and the UE using a CRS or a CSI-RS transmitted in the BS, and feedbacks channel status information indicating the measured channel status to the BS. Information indicating that a reference signal which the UE uses for estimating a channel is the CRS or the CSI-RS is carried through transmission mode information which the BS transmits to the UE.

In the 3GPP LTE-A mobile communication system, a UE measures channel status between a BS and the UE using a CRS or a DeModulation Reference Signal (DM-RS) transmitted in the BS, and detects downlink data by performing a demodulation operation using the measured channel status. Information indicating that a reference signal which the UE uses for the demodulation operation is the CRS or the DM-RS is carried through transmission mode information which the BS transmits to the UE.

FIG. 3 schematically illustrates locations through which a CSI-RS is transmitted in a resource block in an LTE-A mobile communication system according to the related art. Each block in FIG. 3 indicates a Resource Element (RE) included in a resource block. Referring to FIG. 3, a vertical axis denotes a sub-carrier index, and a horizontal axis denotes Orthogonal Frequency Division Multiplexing (OFDM) symbol time.

Each of REs 200-219, CSI-RSs for distinguishing 2 CSI-RS antenna ports may be transmitted. That is, a particular BS broadcasts 2 CSI-RSs for a downlink measurement through a RE 200. As described in FIG. 2, in a cellular radio communication system including a plurality of cells, each cell allocates a RE included in a resource block, and a CSI-RS is transmitted through the allocated RE. For example, in FIG. 2, a CSI-RS may be transmitted through the RE 200 in the cell 100, a CSI-RS may be transmitted through a RE 205 in the cell 110, and a CSI-RS may be transmitted through a RE 210 in the cell 120. As described above, in a LTE-A mobile communication system of the related art, the reason why each cell transmits a CSI-RS using a different time resource and a different frequency resource is to prevent a mutual interference between CSI-RSs.

A sub-frame through which a CSI-RS is transmitted may be determined using an $I_{CSI-RS}$ as a parameter transmitted through a Radio Resource Control (RRC) message. Upon receiving the $I_{CSI-RS}$, a UE determines $T_{CSI-RS}$ as a sub-frame period of a sub-frame through which a CSI-RS is transmitted and $\Delta_{CSI-RS}$ as an offset of the sub-frame through which the CSI-RS is transmitted using Table 1.

TABLE 1

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

The UE receives a CSI-RS through a sub-frame satisfying a criteria expressed in Equation (1).

$$(10n_f + \lfloor n_s/2 \rfloor - \Delta_{CSI-RS}) \bmod T_{CSI-RS} = 0 \quad \text{Equation (1)}$$

where, $n_f$ denotes a Radio Frame Number (RFN), and $n_s$ denotes a slot number included in a radio frame.

In FIG. 3, a DM-RS may be transmitted through REs 220 and 221. If one or two DM-RS transmission ports are used for a data transmission targeting a specific UE, a DM-RS is transmitted through the RE 220, and if more than two DM-RS transmission ports are used for the data transmission targeting the specific UE, the DM-RS is transmitted through the REs 220 and 221.

In FIG. 3, a CRS may be transmitted through a RE 231. The CRS is transmitted through a part of the RE 231 or all of the RE 231 according to the number of CRS transmission ports in the specific cell. A CRS transmission timing may be changed for each cell. That is, in FIG. 3, the CRS is transmitted at intervals of 3 sub-carriers starting from a sub-carrier with a sub-carrier index #0, however, a start position of a CRS transmission for each cell may be determined by applying a modulo operation to a Cell-ID for each cell. For example, the start position of the CRS transmission may be determined as a value of Cell-ID mod 6.

After assuming that downlink data, e.g., a Physical Downlink Shared CHannel (PDSCH) signal is not transmitted through a CSI-RS resource, a DM-RS resource, a CRS resource, and a control channel resource, the UE receives the PDSCH signal through a related resource among remaining resources.

The downlink data is not transmitted through a resource through which a SYNChronization (SYNC) signal is transmitted or a Physical Broadcast CHannel (PBCH) signal is transmitted as well as the resource through which the reference signal is transmitted. For example, the SYNC signal is transmitted through a part of OFDM symbols in sub-frames with sub-frame indexes #0, #5, and the PBCH signal is transmitted through a part of OFDM symbols in a sub-frame with a sub-frame index #0. The positions of the SYNC signal transmission and the PBCH signal transmission are determined according to an LTE-A mobile communication system standard, so the detailed description will be omitted.

In the LTE-A mobile communication system, each sub-frame may be set as a Multimedia Broadcast Multicast Service single Frequency Network (MBSFN) sub-frame, if a specific sub-frame is set as an MBSFN sub-frame, a CRS is not transmitted through resources except for a control channel resource in the specific sub-frame.

An MBSFN sub-frame configuration may be set for each cell, and each of the cells may have a different MBSFN sub-frame configuration. An MBSFN sub-frame may be used for a Physical Multicast CHannel (PMCH) transmission or a PDSCH transmission, if the MBSFN sub-frame is used for the PMCH transmission, an MBSFN reference signal is transmitted as a reference signal, and if the MBSFN sub-frame is used for the PDSCH transmission, a DM-RS and a CSI-RS are transmitted as reference signals.

In the LTE-A mobile communication system assuming that transmission/reception antennas are deployed at a center of each cell as shown in FIG. 2, a UE may detect a sub-frame number by detecting a SYNC signal, may detect MBSFN Sub-frame Configuration Information (SCI) and information on resources through which a CRS and a CSI-RS are transmitted by receiving a PBCH signal and cell associated-information, e.g., a System Information Block (SIB), and may detect position information for a DM-RS resource using PDSCH scheduling information transmitted through a control channel. So, each UE may receive downlink data by detecting a correct position of a resource through which a PDSCH signal is transmitted.

As described in FIG. 2, in an LTE-A mobile communication system assuming that a transmission/reception antenna is arranged at a center in each cell, a UE may detect an System Frame Number (SFN) by detecting a SYNC signal and detect sub-frames through which a CSI-RS is transmitted and sub-frames, through which a CSI-RS is not transmitted, which are collided with sub-frames through which a paging signal and system information are transmitted by receiving a PBCH signal and SIB messages.

In a cellular radio communication system in FIG. 2, there is a limitation for providing a high data rate to a UE located at a cell boundary due to interference from another cell. That is, a data rate for a high speed-data service is strongly influenced by a location of a UE. So, in a cellular radio communication system of the related art, it is possible that a relatively high data rate is provided to a UE located relatively close to a cell center, however, it is difficult for a high data rate to be provided to a UE located at a relatively far distance from a cell center.

In the LTE-A mobile communication system, a CoMP scheme in which a plurality of cells provide a communication service to a particular UE using a cooperation scheme has been proposed in order to provide a high data rate to a UE located at a cell boundary, and enlarge a service region providing the high data rate.

In the LTE-A mobile communication system, there is a need for a method of receiving a downlink data channel signal, e.g., a PDSCH signal by considering a reference signal resource, a SYNC signal resource, and a PBCH resource allocated in each of a plurality of cells in order to effectively use a CoMP scheme. The reference signal resource denotes a resource through which a reference signal is transmitted, the SYNC signal resource denotes a resource through which the SYNC signal is transmitted, and the PBCH resource denotes a resource through which the PBCH signal is transmitted.

In the LTE-A mobile communication system using the CoMP scheme, there is a need for distinguishing a sub-frame through which a PDSCH signal is transmitted among sub-frames transmitted from a plurality of cells and a sub-frame through which a PDSCH signal is not transmitted among the sub-frames in order that the UE effectively receives the PDSCH signal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for transmitting/receiving downlink data channel signal transmission information in a cellular radio communication system using a Cooperative Multi-Point (CoMP) scheme.

Another aspect of the present invention is to provide an apparatus and method for transmitting/receiving downlink data channel signal transmission information in a cellular radio communication system using a CoMP scheme, thereby a signal reception apparatus receives a downlink data channel signal by considering a resource through which a Cell-Specific Reference Signal (CRS) is transmitted.

Another aspect of the present invention is to provide an apparatus and method for transmitting/receiving downlink data channel signal transmission information in a cellular radio communication system using a CoMP scheme, thereby a signal reception apparatus receives a downlink data channel signal by considering a resource through which a Channel Status Information Reference Signal (CSI-RS) is transmitted.

Still another aspect of the present invention is to provide an apparatus and method for transmitting/receiving downlink data channel signal transmission information in a cellular radio communication system using a CoMP scheme, thereby a signal reception apparatus receives a downlink data channel signal by considering a system information transmission.

Still another aspect of the present invention is to provide an apparatus and method for transmitting/receiving downlink data channel signal transmission information in a cellular radio communication system using a CoMP scheme, thereby a signal reception apparatus receives a downlink data channel signal by considering a resource through which a SYNChronization (SYNC) signal is transmitted.

Still another aspect of the present invention is to provide an apparatus and method for transmitting/receiving downlink data channel signal transmission information in a cellular radio communication system using a CoMP scheme, thereby a signal reception apparatus receives a downlink data channel signal by considering a resource through which a Physical Broadcast CHannel (PBCH) signal is transmitted.

Still another aspect of the present invention is to provide an apparatus and method for transmitting/receiving downlink data channel signal transmission information in a cellular radio communication system using a CoMP scheme, thereby a signal reception apparatus receives a downlink data channel signal by considering a resource through which a DeModulation Reference Signal (DM-RS) is transmitted.

Still another aspect of the present invention is to provide an apparatus and method for transmitting/receiving downlink data channel signal transmission information in a cellular radio communication system using a CoMP scheme, thereby a signal reception apparatus receives a downlink data channel signal by considering at least one of a System Information Radio Network Temporary Identifier (SI-RNTI), a Paging Radio Network Temporary Identifier (P-RNTI), a Cell Radio Network Temporary Identifier (C-RNTI), a Semi-Persistent Scheduling Cell Radio Network Temporary Identifier (SPS-C-RNTI), and a Random Access Radio Network Temporary Identifier (RA-RNTI).

Still another aspect of the present invention is to provide an apparatus and method for transmitting/receiving downlink data channel signal transmission information in a cellular radio communication system using a CoMP scheme, thereby a signal reception apparatus receives a downlink data channel signal by considering a Downlink Control Information (DCI) format.

Still another aspect of the present invention is to provide an apparatus and method for transmitting/receiving downlink data channel signal transmission information in a cellular radio communication system using a CoMP scheme, thereby a signal reception apparatus receives a downlink data channel signal by considering CoMP associated-scheduling information.

Still another aspect of the present invention is to provide an apparatus and method for transmitting/receiving downlink data channel signal transmission information on each of downlink data channel signals transmitted by a plurality of signal transmission apparatuses in a cellular radio communication system using a CoMP scheme.

Still another aspect of the present invention is to provide an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a resource through which a CRS is transmitted.

Still another aspect of the present invention is to provide an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a resource through which a CSI-RS is transmitted.

Still another aspect of the present invention is to provide an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a system information transmission.

Still another aspect of the present invention is to provide an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a resource through which a SYNC signal is transmitted.

Still another aspect of the present invention is to provide an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a resource through which a PBCH signal is transmitted.

Still another aspect of the present invention is to provide an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a resource through which a DM-RS is transmitted.

Still another aspect of the present invention is to provide an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering at least one of an SI-RNTI, a P-RNTI, a C-RNTI, an SPS-C-RNTI, and a RA-RNTI.

Still another aspect of the present invention is to provide an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a DCI format.

Still another aspect of the present invention is to provide an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering CoMP associated-scheduling information.

In accordance with one aspect of the present invention, a method for transmitting downlink data channel signal transmission information by a Base Station (BS) in a cellular radio communication system using a CoMP scheme is provided. The method includes transmitting downlink data channel signal transmission information including information related to Resource Elements (REs) scheduled for a downlink data channel signal transmission to a User Equipment (UE), and transmitting downlink data channel signal non-transmission information including information related to REs through which a downlink data channel signal is not transmitted among the REs scheduled for the downlink data channel signal transmission to the UE.

In accordance with another aspect of the present invention, a method for receiving downlink data channel signal transmission information by a UE in a cellular radio communication system using a CoMP scheme is provided. The method includes receiving downlink data channel signal transmission information including information related to REs scheduled for a downlink data channel signal transmission from a Base Station (BS), and receiving downlink data channel signal non-transmission information including information related to REs through which a downlink data channel signal is not transmitted among the REs scheduled for the downlink data channel signal transmission from the BS.

In accordance with further another aspect of the present invention, a BS in a cellular radio communication system using a CoMP scheme is provided. The BS includes a transmitter for transmitting downlink data channel signal transmission information including information related to REs scheduled for a downlink data channel signal transmission to a UE, and for transmitting downlink data channel signal non-transmission information including information related to REs through which a downlink data channel signal is not transmitted among the REs scheduled for the downlink data channel signal transmission to the UE.

In accordance with still another aspect of the present invention, a UE in a cellular radio communication system using a CoMP scheme is provided. The UE includes a receiver for receiving downlink data channel signal transmission information including information related to REs scheduled for a downlink data channel signal transmission from a BS, and for receiving downlink data channel signal non-transmission information including information related to REs through which a downlink data channel signal is not transmitted among the REs scheduled for the downlink data channel signal transmission from the BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 7 schematically illustrates a sub-frame structure in a case where 2 cells use different Multimedia Broadcast Multicast Service single Frequency Network (MBSFN) sub-frame configurations in a cellular radio communication system using a CoMP scheme according to an exemplary embodiment of the present invention;

FIG. 8 schematically illustrates a sub-frame structure in a case where 2 cells use different sub-frame indexes in a cellular radio communication system using a CoMP scheme according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
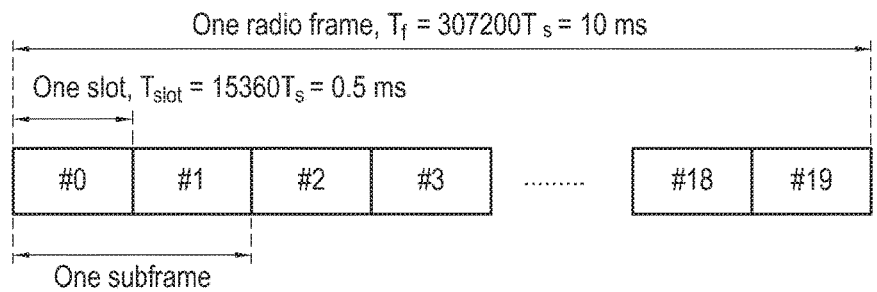
FIG. 1 schematically illustrates a structure of a radio frame according to a Long-Term Evolution-Advanced (LTE-A) mobile communication system according to the related art.
Figure 2:
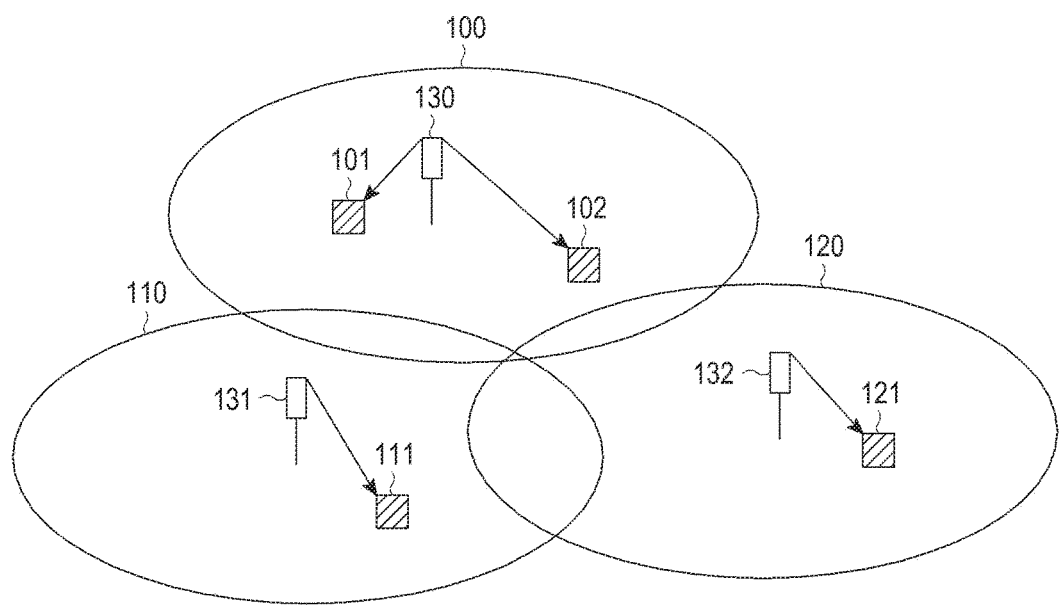
FIG. 2 schematically illustrates a structure of a cellular radio communication system according to the related art.
Figure 3:
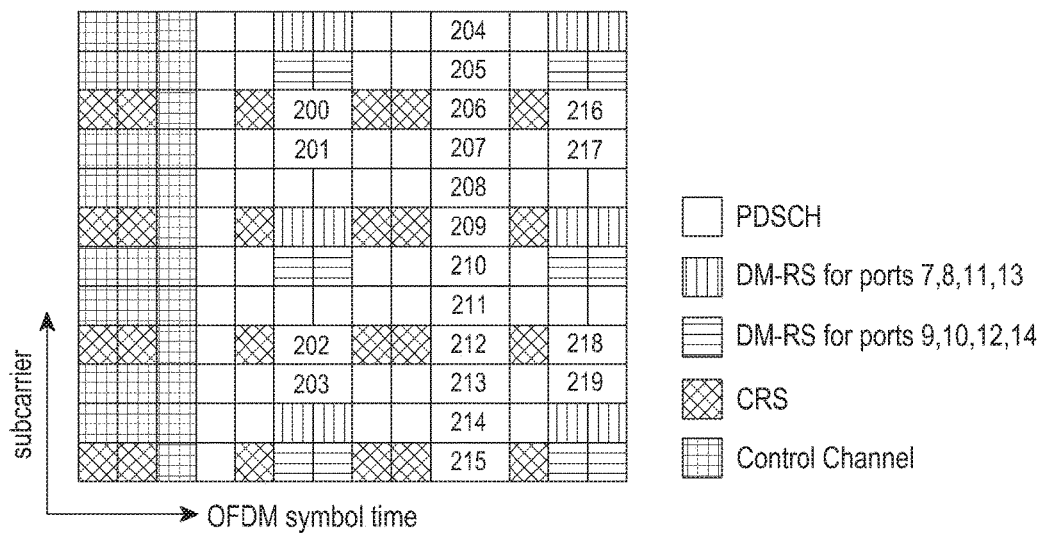
FIG. 3 schematically illustrates locations through which a Channel Status Information-Reference Signal (CSI-RS) is transmitted in a resource block in an LTE-A mobile communication system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure the terms Base Station (BS) and evolved Node B (eNB) may be interchangeably referred to. Similarly, the terms Mobile Station (MS) and User Equipment (UE) may be interchangeably referred to.

An exemplary embodiment of the present invention proposes an apparatus and method for transmitting/receiving downlink data channel signal transmission information in a cellular radio communication system using a Cooperative Multi-Point (CoMP) scheme.

Another exemplary embodiment of the present invention proposes an apparatus and method for transmitting/receiving downlink data channel signal transmission information in a cellular radio communication system using a CoMP scheme, thereby a signal reception apparatus receives a downlink data channel signal by considering a resource through which a Cell-specific Reference Signal (CRS) is transmitted.

Further another exemplary embodiment of the present invention proposes an apparatus and method for transmitting/receiving downlink data channel signal transmission information in a cellular radio communication system using a CoMP scheme, thereby a signal reception apparatus receives a downlink data channel signal by considering a resource through which a Channel Status Information Reference Signal (CSI-RS) is transmitted.

Still another exemplary embodiment of the present invention proposes an apparatus and method for transmitting/receiving downlink data channel signal transmission information in a cellular radio communication system using a CoMP scheme, thereby a signal reception apparatus receives a downlink data channel signal by considering a system information transmission.

Still another exemplary embodiment of the present invention proposes an apparatus and method for transmitting/receiving downlink data channel signal transmission information in a cellular radio communication system using a CoMP scheme, thereby a signal reception apparatus receives a downlink data channel signal by considering a resource through which a SYNChronization (SYNC) signal is transmitted.

Still another exemplary embodiment of the present invention proposes an apparatus and method for transmitting/receiving downlink data channel signal transmission information in a cellular radio communication system using a CoMP scheme, thereby a signal reception apparatus receives a downlink data channel signal by considering a resource through which a Physical Broadcast CHannel (PBCH) signal is transmitted.

Still another exemplary embodiment of the present invention proposes an apparatus and method for transmitting/receiving downlink data channel signal transmission information in a cellular radio communication system using a CoMP scheme, thereby a signal reception apparatus receives a downlink data channel signal by considering a resource through which a DeModulation Reference Signal (DM-RS) is transmitted.

Still another exemplary embodiment of the present invention proposes an apparatus and method for transmitting/receiving downlink data channel signal transmission information in a cellular radio communication system using a CoMP scheme, thereby a signal reception apparatus receives a downlink data channel signal by considering at least one of a System Information Radio Network Temporary Identifier (SI-RNTI), a Paging Radio Network Temporary Identifier (P-RNTI), a Cell Radio Network Temporary Identifier (C-RNTI), a Semi-Persistent Scheduling Cell Radio Network Temporary Identifier (SPS-C-RNTI), and a Random Access Radio Network Temporary Identifier (RA-RNTI).

Still another exemplary embodiment of the present invention proposes an apparatus and method for transmitting/receiving downlink data channel signal transmission information in a cellular radio communication system using a CoMP scheme, thereby a signal reception apparatus receives a downlink data channel signal by considering a Downlink Control Information (DCI) format.

Still another exemplary embodiment of the present invention proposes an apparatus and method for transmitting/receiving downlink data channel signal transmission information in a cellular radio communication system using a CoMP scheme, thereby a signal reception apparatus receives a downlink data channel signal by considering CoMP associated-scheduling information.

Still another exemplary embodiment of the present invention proposes an apparatus and method for transmitting/receiving downlink data channel signal transmission information on each of downlink data channel signals transmitted by a plurality of signal transmission apparatuses in a cellular radio communication system using a CoMP scheme.

Still another exemplary embodiment of the present invention proposes an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a resource through which a CRS is transmitted.

Still another exemplary embodiment of the present invention proposes an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a resource through which a CSI-RS is transmitted.

Still another exemplary embodiment of the present invention proposes an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a system information transmission.

Still another exemplary embodiment of the present invention proposes an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a resource through which a SYNC signal is transmitted.

Still another exemplary embodiment of the present invention proposes an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a resource through which a PBCH signal is transmitted.

Still another exemplary embodiment of the present invention proposes an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a resource through which a DM-RS is transmitted.

Still another exemplary embodiment of the present invention proposes an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering at least one of an SI-RNTI, a P-RNTI, a C-RNTI, an SPS-C-RNTI, and a RA-RNTI.

Still another exemplary embodiment of the present invention proposes an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering a DCI format.

Still another exemplary embodiment of the present invention proposes an apparatus and method for transmitting/receiving downlink data channel signal transmission information in a cellular radio communication system using a CoMP scheme, thereby a signal reception apparatus receives each of downlink data channel signals transmitted by a plurality of signal transmission apparatuses by considering CoMP associated-scheduling information.

Exemplary embodiments of the present invention are described below with reference to a Long Term Evolution Advanced (LTE-A) mobile communication system based on an Orthogonal Frequency Division Multiplexing (OFDM) scheme. However, it will be understood by those of ordinary skill in the art that exemplary embodiments of the present invention may be applied to any one of a High Speed Downlink Packet Access (HSDPA) mobile communication system, a High Speed Uplink Packet Access (HSUPA) mobile communication system, a Long-Term Evolution (LTE) mobile communication system, a High Rate Packet Data (HRPD) mobile communication system proposed in a 3rd Generation Project Partnership 2 (3GPP2), an Institute of Electrical and Electronics Engineers (IEEE) 802.16m mobile communication system, etc.

For convenience, it will be assumed that the LTE-A mobile communication system provides a service to a UE using a CoMP scheme, and the downlink data channel signal is a Physical Downlink Shared Channel (PDSCH) signal.

Meanwhile, a cellular radio communication system is implemented by deploying a plurality of cells within a limited region, with each cell providing a radio communication service to UEs in a related cell through a BS providing the radio communication service. A particular UE only receives the radio communication service from a semi-statically selected cell. A scheme in which the radio communication service is provided through one BS is referred to as a non-Cooperative Multi-Point (non-CoMP) scheme.

In a cellular radio communication system using the non-CoMP scheme, a high speed-data rate provided to each of all UEs in a cell extremely varies according to a location of each UE. That is, a relatively high-data rate may be provided to a UE located at a cell center, however, it is difficult to provide a relatively high-data rate to a UE located at a cell boundary.

In the CoMP scheme, a plurality of cells provides a service to a UE located at a cell boundary by cooperating with one another. The cellular radio communication system using the CoMP scheme may provide an enhanced radio communication service compared with the cellular radio communication system using the non-CoMP scheme. For convenience, a cellular radio communication system using a CoMP scheme is referred to as 'cellular CoMP radio communication system', and a cellular radio communication system using a non-CoMP scheme is referred to as 'cellular non-CoMP radio communication system'.

Exemplary embodiments of the present invention propose a PDSCH signal transmission information transmitting/receiving method in which a UE may effectively receive PDSCH signals transmitted from a plurality of cells using a typical CoMP scheme such as a Dynamic cell Selection (DS) scheme, a Dynamic cell Selection with Dynamic Blanking (DS/DB) scheme, a Joint Transmission (JT), and a Coordinated Scheduling/Coordinated Beamforming (CS/CB) scheme.

In the DS scheme, a UE measures channel status for each cell, the UE transmits feedback information indicating the measured channel status to a BS, the BS receiving the feedback information dynamically selects a cell which transmits downlink data targeting the UE, and the BS transmits data through the selected cell.

In the DS/DB scheme, a particular cell does not transmit data in order to decrease interference from the particular cell to other cell. In the JT scheme, a plurality of cells transmits data to a particular UE at the same time.

In the CS/CB scheme, cooperated cells schedule data and form a beam through mutual cooperation thereby reducing mutual interference.

In exemplary embodiments of the present invention, a UE may effectively receive a PDSCH signal by designing a PDSCH signal reception scheme in order that a CoMP scheme such as a DS scheme, a DS/DB scheme, a JT scheme, and a CS/CB scheme is effectively used in an LTE-A mobile communication system using a CoMP scheme.

Figure 4:
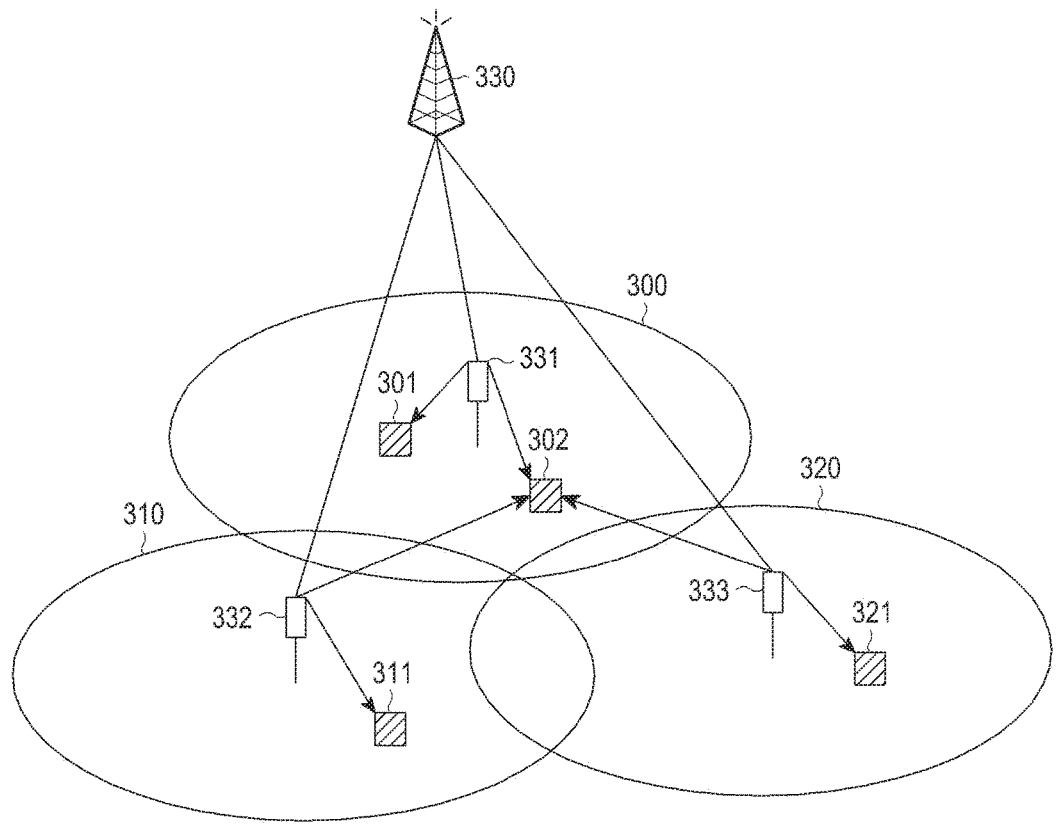
FIG. 4 schematically illustrates a structure of a cellular radio communication system using a Cooperative Multi-Point (CoMP) scheme according to an exemplary embodiment of the present invention.

FIG. 4 schematically illustrates a structure of a cellular radio communication system using a CoMP scheme according to an exemplary embodiment of the present invention.

Referring to FIG. 4, the cellular radio communication system using the CoMP scheme includes 3 cells, and each cell denotes a data transmission region to which a particular transmission point may provide a service. Each transmission point may be a Remote Radio Head (RRH) which commonly uses a Cell IDentifier (Cell-ID) with a macro BS in a macro region, a macro cell or a pico cell in which each transmission point uses a different Cell-ID.

In an exemplary embodiment of the present invention, a Central Control Apparatus (CCA) denotes an apparatus such as a Base Station (BS) or a Base Station Controller (BSC) which may transmit/receive data to/from a UE, and process the transmitted/received data. If each transmission point is a RRH which commonly uses a Cell-ID with a macro BS, the macro BS becomes the CCA. If each transmission point is a macro cell or a pico cell which uses a different Cell-ID, an apparatus for integrating cells and managing the integrated cells becomes the CCA.

In FIG. 4, the cellular radio communication system using the CoMP scheme includes 3 cells 300, 310 and 320, UEs 301, 311 and 321 which receive data from the closest cell, and a UE 302 which receive data from each of the cells 300, 310 and 320 using a CoMP scheme. Each of the UEs 301, 311 and 321 which receive the data from the closest cell estimates channel status for a cell at which each of the UEs 301, 311 and 321 is located using a reference signal, i.e., a CSI-RS, and transmits feedback information including the channel estimation result to a CCA 330. In FIG. 4, reference signs 331, 332 and 333 indicate BSs managing the cells 300, 310 and 320, respectively, and each of the BSs 331, 332 and 333 may communicate with the CCA 330.

In FIG. 4, the UE 302 receiving data transmitted from each of the cells 300, 310 and 320 using the CoMP scheme should estimate a channel status for each cell using cell specific CSI-RSs transmitted from all of the cells 300, 310 and 320. So, the CCA 330 allocates 3 CSI-RS resources corresponding to each cell to the UE 302 for a channel estimation operation performed by the UE 302.

Figure 5:
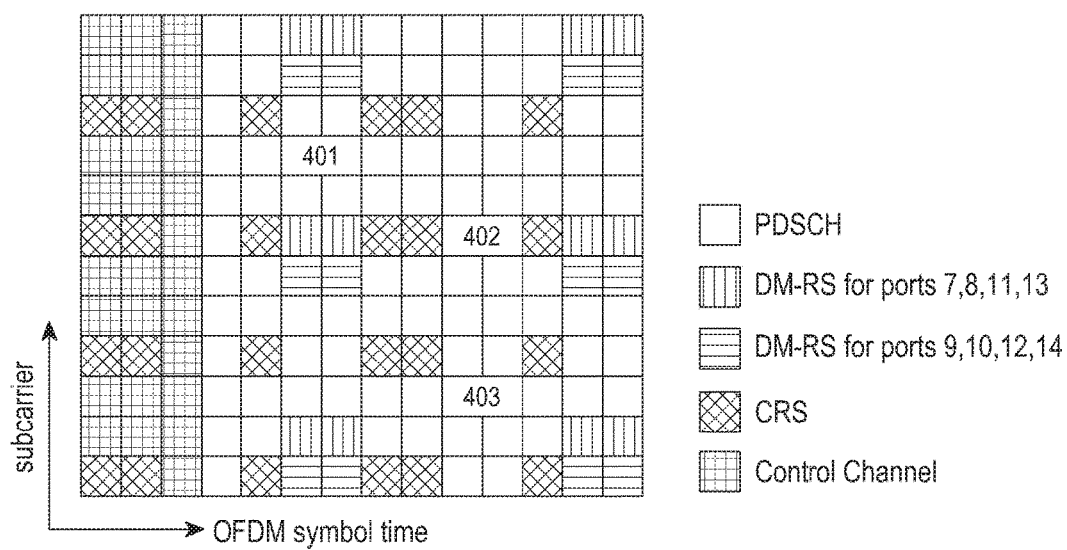
FIG. 5 schematically illustrates locations of a CSI-RS resource through which a CSI-RS is transmitted in a resource block in a cellular radio communication system using a CoMP scheme according to an exemplary embodiment of the present invention.

FIG. 5 schematically illustrates locations of a CSI-RS resource through which a CSI-RS is transmitted in a resource block in a cellular radio communication system using a CoMP scheme according to an exemplary embodiment of the present invention.

Each block in FIG. 5 indicates a Resource Element (RE) included in a resource block.

Referring to FIGS. 4 and 5, a CCA 330 allocates 3 CSI-RS resources 401, 402 and 403 and transmits a CSI-RS using the 3 CSI-RS resources 401, 402 and 403 in order that a UE 302 which receives a CSI-RS using a CoMP scheme may estimate a channel of each of 3 cells 300, 310 and 320 and estimate a channel through which control information and system information are transmitted. That is, a CSI-RS resource through a CSI-RS used for estimating a channel of the cell 300 is transmitted is a RE 401, a CSI-RS resource through a CSI-RS used for estimating a channel of the cell 310 is transmitted is a RE 402, and a CSI-RS resource through a CSI-RS used for estimating a channel of the cell 320 is transmitted is a RE 403.

A set including a resource through which a CSI-RS, used for a UE receiving data from a plurality of cells using a CoMP scheme to estimate channel status for each cell, is transmitted is referred to as a measurement set. That is, the measurement set includes a resource, allocated to an arbitrary UE, through which the CSI-RS is transmitted. For convenience, a resource through which a CSI-RS is transmitted is referred to as 'CSI-RS resource'. The measurement set includes at least one CSI-RS resource.

In FIG. 5, a CSI-RS resource for 3 cells is allocated in one resource block, and transmission timing information on a CSI-RS transmission sub-frame may be provided to the UE. That is, $I_{CSI-RS}$ in Table 1 should be transmitted to CSI-RS resources 401, 402 and 403 for the 3 cells. For example, the UE may acquire a $T_{CSI-RS}$ and a $\Delta_{CSI-RS}$ in Table 1 as the transmission timing information upon receiving the $I_{CSI-RS}$. Information on the number of transmission antennas which each CSI-RS resource uses should be transmitted to the UE. Further, information on transmission power used for each CSI-RS transmission should be transmitted to the UE.

If all CSI-RS resources included in a measurement set allocated to a UE which receives a downlink data channel signal from each cell using a CoMP scheme are CSI-RS resources allocated for estimating channel status for a RRH using a Cell-ID identical to a Cell-ID of a cell which the UE accesses, i.e., a serving cell, a Cell-Specific Reference Signal (CRS) resource, a SYNC signal resource, a PBCH resource, a transmission timing of a CRS, a transmission timing of a SYNC signal, a transmission timing of a PBCH signal, and a Multimedia Broadcast Multicast Service single Frequency Network (MBSFN) sub-frame configuration used in cells in which a downlink data channel signal is transmitted using a CoMP scheme are identical to a CRS resource, a SYNC signal resource, a PBCH resource, a transmission timing of a CRS, a transmission timing of a SYNC signal, a transmission timing of a PBCH signal, and an MBSFN sub-frame configuration used in the serving cell. So, a UE may receive a PDSCH signal through resources except for the CRS resource, the SYNC signal resource, and the PBCH resource using a scheme identical to a scheme used in an LTE-A mobile communication system of the related art. Here, the CRS resource denotes a resource through which a CRS is transmitted.

However, if at least one of the CSI-RS resources included in the measurement set is allocated in a cell using a Cell-ID different from a Cell-ID of a serving cell, it is not possible for the UE to detect a transmission timing of a CRS, a SYNC signal, and a PBCH signal transmitted in the cell using the Cell-ID different from the Cell-ID of the serving cell using the scheme identical to the scheme used in the LTE-A mobile communication system of the related art. So, the UE may not effectively receive the PDSCH signal.

An exemplary embodiment #1 to an exemplary embodiment #11 of the present invention propose a method for transmitting/receiving PDSCH signal transmission information thereby UE may effectively receive a PDSCH signal by considering a CRS transmission timing, a SYNC transmission timing, and a PBCH transmission timing. The description for the exemplary embodiment #1 to the embodiment #11 will be followed.

Figure 6:
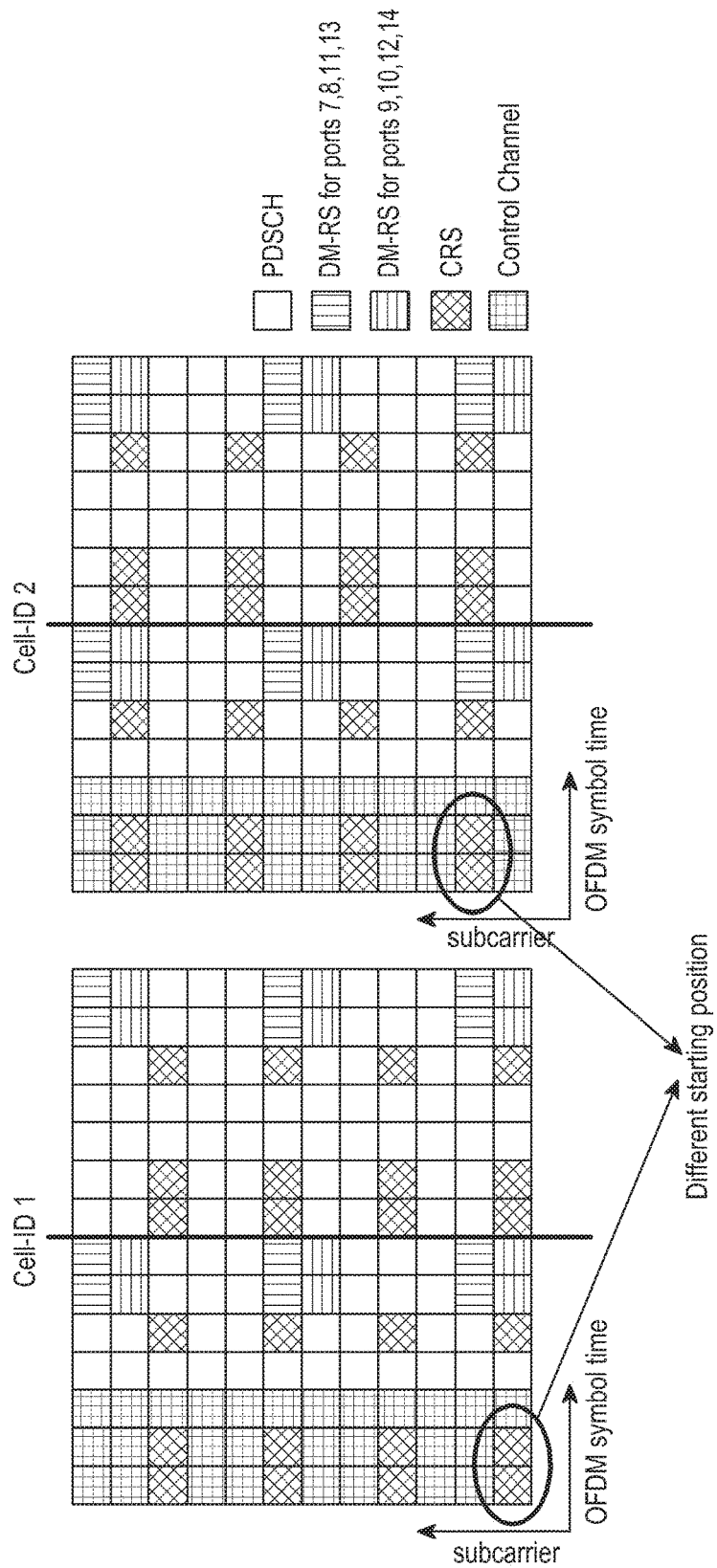
FIG. 6 schematically illustrates a method for allocating a CSI-RS resource in a cellular radio communication system using a CoMP scheme according to an exemplary embodiment of the present invention.

FIG. 6 schematically illustrates a method for allocating a CSI-RS resource in a cellular radio communication system using a CoMP scheme according to an exemplary embodiment of the present invention.

Referring to FIG. 6, a vertical axis denotes a sub-carrier index, and a horizontal axis denotes OFDM symbol time.

A position of a CRS resource allocated in a cell using a Cell-ID 1 starts from a sub-carrier #0, and a position of a CRS resource allocated in a cell using a Cell-ID 2 starts from a sub-carrier #1. So, a UE may receive a PDSCH signal through a cell dynamically selected from the cell using the Cell-ID 1 and the cell using the Cell-ID 2, or may receive the PDSCH signal through the cell using the Cell-ID 1 and the cell using the Cell-ID 2. So, available PDSCH resources may be changed according to the cell through which the UE receives the PDSCH signal.

Figure 7:
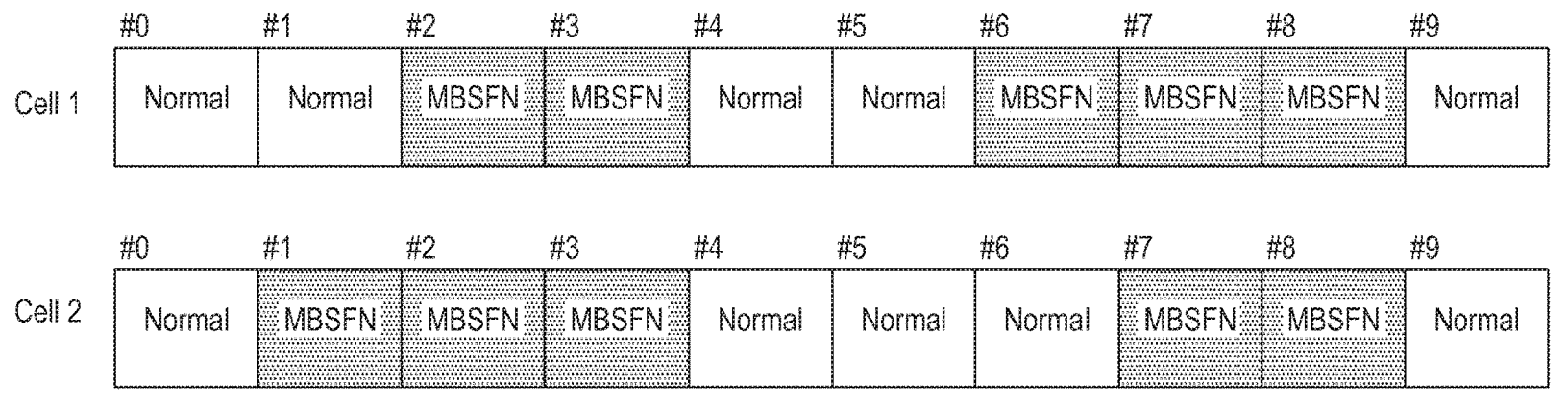

FIG. 7 schematically illustrates a sub-frame structure in a case where 2 cells use different MBSFN sub-frame configurations in a cellular radio communication system using a CoMP scheme according to an exemplary embodiment of the present invention.

In FIG. 7, an MBSFN sub-frame which does not include a CRS resource is shown as "MBSFN", and a normal sub-frame including the CRS resource is shown as "Normal". For convenience, it is assumed that an MBSFN sub-frame is mainly used for a PDSCH signal transmission.

Referring to FIG. 7, sub-frames #0, #4, #5, #9 are set as normal sub-frames in a Cell 1 and a Cell 2, so a problem occurs that a UE receives a PDSCH signal by considering which resource among CRS resources allocated in the Cell 1 and the Cell 2 occurs as described in FIG. 6. On the other hand, sub-frames #2, #3, #7, #8 do not include a CRS resource in the Cell 1 and the Cell 2, so the problem does not occur, and the UE receives a PDSCH signal by considering a DM-RS resource and a CSI-RS resource.

The sub-frame #1 is set as a normal sub-frame in the Cell 1 and set as an MBSFN sub-frame in the Cell 2. So, the sub-frame #1 includes a CRS resource in the Cell 1 and does not include the CRS resource in the Cell 2.

That is, the UE may detect that different PDSCH resources are allocated in each sub-frame based on an MBSFN sub-frame configuration by detecting the MBSFN sub-frame configuration for cells which allocate CSI-RS resources included in a measurement set.

Figure 8:
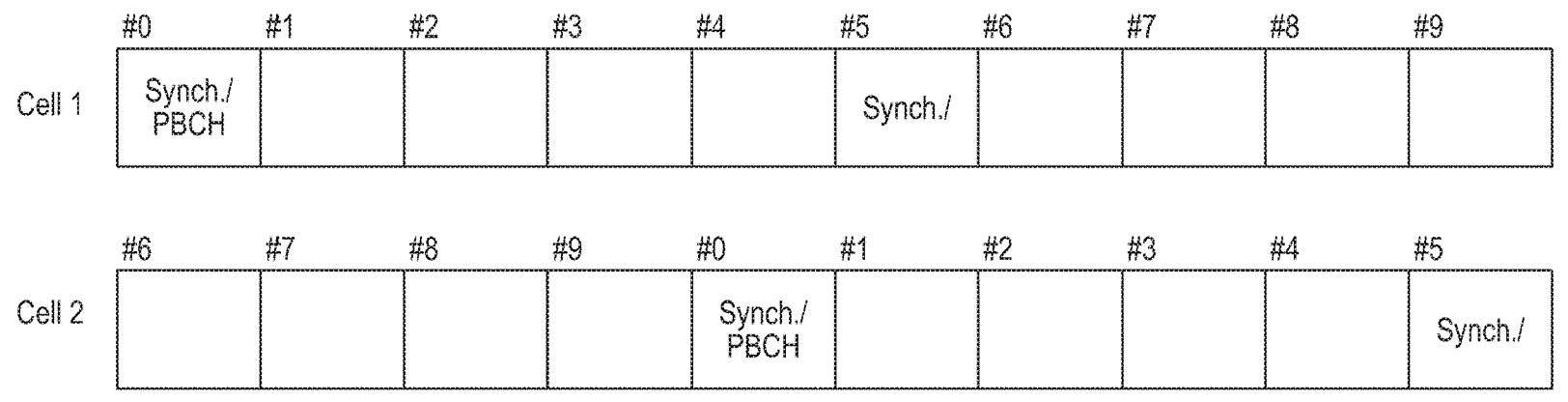

FIG. 8 schematically illustrates a sub-frame structure in a case where 2 cells use different sub-frame indexes in a cellular radio communication system using a CoMP scheme according to an exemplary embodiment of the present invention.

Referring to FIG. 8, a sub-frame including a SYNC signal resource is shown as "Synch.", a sub-frame including a PBCH signal resource is shown as "PBCH", and a sub-frame including the SYNC signal resource and the PBCH signal resource is "Synch./PBCH".

In FIG. 8, a sub-frame through which a SYNC signal is transmitted in a Cell 1 is different from a sub-frame through which the SYNC signal is transmitted in a Cell 2, and a sub-frame through which a PBCH signal is transmitted in the Cell 1 is different from a sub-frame through which the PBCH signal is transmitted in a Cell 2. That is, based on a sub-frame index of the Cell 1, a SYNC signal and a PBCH signal for the Cell 1 are transmitted through a sub-frame #0, the SYNC signal for the Cell 1 is transmitted through a sub-frame #5, a SYNC signal and a PBCH signal for the Cell 2 are transmitted through a sub-frame #0, which corresponds to sub-frame #4 of Cell 1, and the SYNC signal for the Cell 2 is transmitted through a sub-frame #5, which corresponds to sub-frame #9 of Cell 1. So, a UE should receive a PDSCH signal through resources except for a SYNC signal resource or a PBCH resource of the Cell 1 or the Cell 2 corresponding to a sub-frame index scheduled for a PDSCH signal transmission.

The description for the exemplary embodiment #1 to the embodiment #11 will be followed.

Exemplary Embodiment #1

Figure 9:
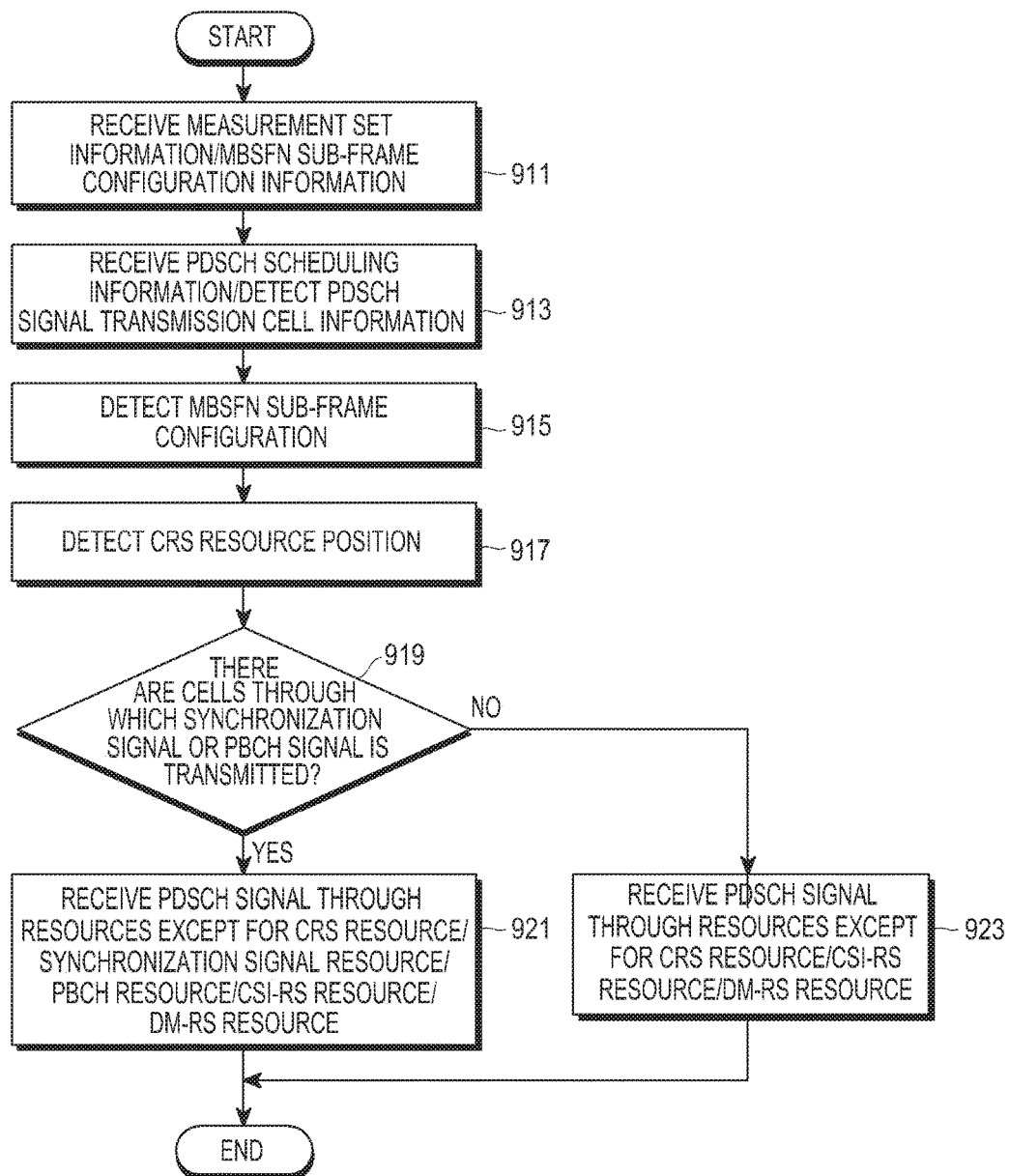
FIG. 9 is a flowchart illustrating a method for receiving a Physical Downlink Shared CHannel (PDSCH) signal in a User Equipment (UE) in a cellular radio communication system using a CoMP scheme according to an exemplary embodiment #1 of the present invention.

FIG. 9 is a flowchart illustrating a method for receiving a PDSCH signal in a UE in a cellular radio communication system using a CoMP scheme according to an exemplary embodiment #1 of the present invention.

Prior to a description for FIG. 9, in the exemplary embodiment #1 of the present invention, a BS transmits a downlink scheduling information through a Physical Downlink Control Channel (PDCCH), and the downlink scheduling information includes cell information used for a PDSCH signal transmission. A UE receives a PDSCH signal based on a PDSCH resource mapping scheme of a related cell after detecting that the PDSCH signal transmission occurs in which cell using the cell information.

Referring to FIG. 9, a UE receives Measurement Set Information (MSI) and MBSFN Sub-frame Configuration Information (SCI) from a BS in step 911. The BS transmits the MBSFN SCI to the UE using various schemes, and a description for the various schemes is provided below.

In the first scheme, the BS transmits the MBSFN SCI used in cells which allocate each of CSI-RS resources included in a measurement set with the MSI to the UE.

For example, if the CSI-RS resources included in the measurement set are a CSI-RS-1 resource, a CSI-RS-2 resource, and a CSI-RS-3 resource, it will be assumed that MSI is {CSI-RS-1, CSI-RS-2, CSI-RS-3}, and MBSFN SCI for each CSI-RS resource is {MBSFN-1, MBSFN-2, MBSFN-3}. The MBSFN-1 includes MBSFN SCI used in a cell which allocates the CSI-RS-1 resource, the MBSFN-2 includes MBSFN SCI used in a cell which allocates the CSI-RS-2 resource, and the MBSFN-3 includes MBSFN SCI used in a cell which allocates the CSI-RS-3 resource.

The MBSFN SCI may be a value corresponding to a sub-frame index used in a serving cell. On the other hand, the MBSFN SCI may be a value corresponding to a sub-frame index used in a cell which allocates a CSI-RS resource. If the MBSFN SCI is the value corresponding to the sub-frame index used in the cell which allocates the CSI-RS resource, the BS should transmit a sub-frame index difference value between the sub-frame index used in the serving cell and the sub-frame index used in the cell which allocates the CSI-RS resource. In this case, the UE may detect a MBSFN sub-frame index of a related cell based on the MBSFN SCI and the sub-frame index difference value. For example, the UE may detect the MBSFN sub-frame index of the related cell by adding the sub-frame index difference value to the MBSFN SCI.

In the second scheme, the BS transmits Cell-IDs used in cells which allocate CSI-RS resources included in the measurement set, the MSI, and MBSFN SCI of cells using Cell-IDs different from a Cell-ID used in a serving cell among the Cell-IDs used in the cells which allocate the CSI-RS resources included in the measurement set to the UE.

For example, it will be assumed that MSI and Cell-ID information for a specific UE is {CSI-RS-1 (Cell-ID-1), CSI-RS-2 (Cell-ID-1), CSI-RS-3 (Cell-ID-2)}, and a Cell-ID-1 is a Cell-ID of a serving cell. In this case, the BS transmits the MSI, Cell-IDs used in cells which allocate CSI-RS resources included in the measurement set, and MBSFN SCI, i.e., MBSFN-2 used in a cell using a Cell-ID different from the Cell-ID used in the serving cell, i.e., a Cell-ID-2 to the UE. In this case, the UE detects MBSFN SCI of a cell using the Cell-ID-1 using MBSFN SCI of the serving cell included in system information of each cell.

In the third scheme, the BS transmits the MSI, information indicating whether each of CSI-RS resources included in the measurement set is allocated in the serving cell, and MBSFN SCI used in a cell different from the serving cell among cells which allocate the CSI-RS resources included in the measurement set to the UE.

For example, it will be assumed that MSI for a specific UE is {CSI-RS-1, CSI-RS-2, CSI-RS-3}, and the information indicating whether each of the CSI-RS resources included in the measurement set is allocated in the serving cell is a bitmap, i.e., [1, 0, 0]. Here, a value '1' indicates that a related CSI-RS resource is a CSI-RS resource allocated in the serving cell, and a value '0' indicates that a related CSI-RS resource is a CSI-RS resource allocated in a cell different from the serving cell. The BS transmits {MBSFN-2, MBSFN-3} as MBSFN SCI for a CSI-RS-2 resource and a CSI-RS-3 resource allocated in the cell different from the serving cell to the UE. In this case, the UE detects MBSFN SCI for a CSI-RS-1 resource using MBSFN SCI of the serving cell included in system information of each cell.

Meanwhile, the UE receives PDSCH scheduling information through a PDCCH, and detects information for a cell which transmits a PDSCH signal using the PDSCH scheduling information in step 913. If MSI for a specific UE is {CSI-RS-1, CSI-RS-2}, a bitmap including 2 bits is transmitted to the specific UE, and a PDSCH signal is transmitted in a cell which allocates a CSI-RS-1 resource if the bitmap is [1, 0]. If the bitmap is [0, 1], the PDSCH signal is transmitted in a cell which allocates a CSI-RS-2 resource, and the PDSCH signal is transmitted in the both cells which allocate the CSI-RS-1 resource and the CSI-RS-2 resource if the bitmap is [1, 1].

The UE detects MBSFN SCI for cells in which a PDSCH signal is transmitted in a scheduled sub-frame in step 915. The UE detects a CRS resource position of cells in which the scheduled sub-frame is set as a normal sub-frame among the cells in which the PDSCH signal is transmitted in the scheduled sub-frame in step 917. The operation of detecting the CRS resource position is described below.

When the PDSCH signal is transmitted in one cell, the UE receives the PDSCH signal without considering a CRS resource of a related cell if the CRS resource is set as a MBSFN sub-frame, and the UE detects that the PDSCH signal is not transmitted in a position of the CRS resource if the CRS resource is set as a normal sub-frame.

If the PDSCH signal is transmitted in a plurality of cells at the same time, the UE detects that the PDSCH signal is not transmitted through CRS resources set as normal sub-frames among CRS resources allocated in the plurality of cells. The BS may transmit information on a position of a CRS resource allocated in a cell different from a serving cell with MSI to the UE, and the operation of transmitting the CRS resource position information is described below.

Firstly, the BS may transmit the information on the position of the CRS resource allocated in the cell different from the serving cell by transmitting Cell-IDs used in cells which allocate each CSI-RS resource to the UE.

Secondly, the BS may transmit the information on the position of the CRS resource allocated in the cell different from the serving cell by transmitting a start position of a CRS resource to the UE.

Thirdly, the BS may transmit the information on the position of the CRS resource allocated in the cell different from the serving cell by transmitting the number of CRS ports with the MSI. In this case, the UE may detect the position of the CRS resource by assuming that cells except for the serving cell always use 4 CRS ports.

Meanwhile, the UE determines whether there are cells in which a SYNC signal or a PBCH signal is transmitted in the scheduled sub-frame among the cells in which the PDSCH signal is transmitted in the scheduled sub-frame in step 919.

If there are cells in which the SYNC signal or the PBCH signal is transmitted in the scheduled sub-frame among the cells in which the PDSCH signal is transmitted in the scheduled sub-frame, the UE detects downlink data by receiving the PDSCH signal through resources except for a CRS resource, a SYNC signal resource or a PBCH resource, a CSI-RS resource, and a DM-RS resource in step 921.

If there are no cells in which the SYNC signal or the PBCH signal is transmitted in the scheduled sub-frame among the cells in which the PDSCH signal is transmitted in the scheduled sub-frame, the UE detects downlink data by receiving the PDSCH signal through resources except for a CRS resource, a CSI-RS resource, and a DM-RS resource in step 923.

In FIG. 9, it is assumed that the UE may detect a transmission timing of the SYNC signal and the PBCH signal for the cells except for the serving cell.

However, the UE may not detect the transmission timing of the SYNC signal and the PBCH signal for the cells except for the serving cell. In this case, step 919 may be modified as a step in which the UE determines whether a SYNC signal transmission or a PBCH signal transmission occurs in a related sub-frame of the serving cell. That is, the UE receives the PDSCH signal by considering a transmission timing of the SYNC signal and the PBCH signal for the serving cell if the UE may not detect a transmission timing of the SYNC signal and the PBCH signal for the cells except for the serving cell.

Exemplary Embodiment #2

Figure 10:
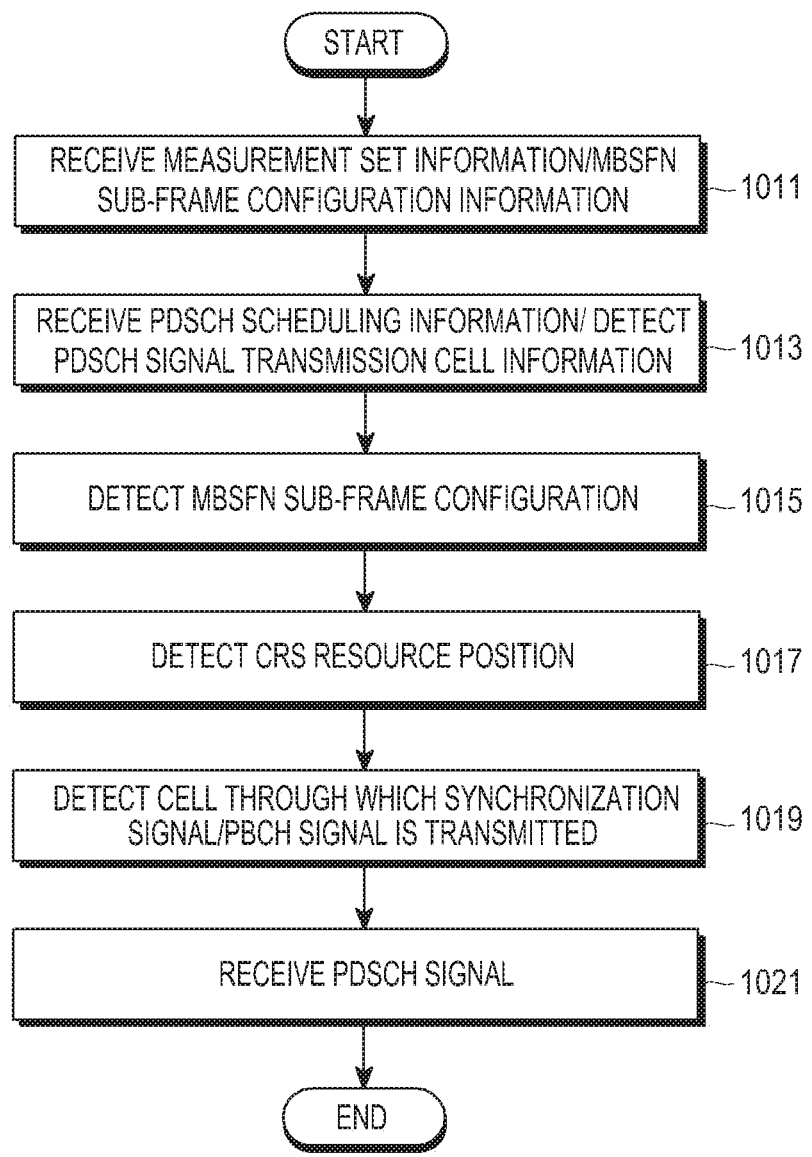
FIG. 10 is a flowchart illustrating a method for receiving a PDSCH signal in a UE in a cellular radio communication system using a CoMP scheme according to an exemplary embodiment #2 of the present invention.

FIG. 10 is a flowchart illustrating a method for receiving a PDSCH signal in a UE in a cellular radio communication system using a CoMP scheme according to an exemplary embodiment #2 of the present invention.

Prior to a description for FIG. 10, in the exemplary embodiment #2 of the present invention, a BS transmits a downlink scheduling information through a PDCCH, and the downlink scheduling information includes cell information used for a PDSCH signal transmission. A UE receives a PDSCH signal based on a PDSCH resource mapping scheme of a related cell after detecting that the PDSCH signal transmission occurs in which cell using the cell information.

Referring to FIG. 10, a UE receives MSI and MBSFN SCI of cells which allocate CSI-RS resources included in a measurement set from a BS in step 1011. The UE receives PDSCH scheduling information through a PDCCH from the BS, and detects information on a cell which transmits a PDSCH signal using the PDSCH scheduling information in step 1013. For example, the information on the cell which transmits the PDSCH signal may be implemented with 1 bit, and the UE interprets the information on the cell which transmits the PDSCH signal as Table 2.

TABLE 2

| Information on a cell transmitting a PDSCH signal | Interpretation |
| --- | --- |
| 0 | A PDSCH signal is transmitted in a serving cell. |
| 1 | A PDSCH signal is transmitted in cells which allocate CSI-RS resources included in a measurement set. |

Meanwhile, the information on the cell which transmits the PDSCH signal may be implemented with 2 bits, and the UE interprets the information on the cell which transmits the PDSCH signal as Table 3.

TABLE 3

| Information on a cell transmitting a PDSCH signal | Interpretation |
|---|---|
| 00 | A PDSCH signal is transmitted in a serving cell. |
| 01 | A PDSCH signal is transmitted in the first cell configured by a RRC message. |
| 10 | A PDSCH signal is transmitted in the second cell configured by a RRC message. |
| 11 | A PDSCH signal is transmitted in cells which allocate CSI-RS resources included in a measurement set. |

As described in Table 3, the UE detects downlink data by receiving the PDSCH signal through resources except for a CRS resource, a PBCH resource, a SYNC signal resource, a CSI-RS resource, and a DM-RS resource included in a related sub-frame if the UE detects that the PDSCH signal is transmitted in the serving cell (information on a cell transmitting a PDSCH signal=00), or the UE detects that the PDSCH signal is transmitted in the first cell set through a Radio Resource Control (RRC) message (information on a cell transmitting a PDSCH signal=01), or the UE detects that the PDSCH signal is transmitted in the second cell configured by the RRC message (information on a cell transmitting a PDSCH signal=10).

On the other hand, the UE detects downlink data by receiving the PDSCH signal through resources except for a CRS resource, a PBCH resource, a SYNC signal resource, a CSI-RS resource, and a DM-RS resource which may be included in a related sub-frame as not an MBSFN sub-frame for the cells which allocate the CSI-RS resources included in the measurement set if the UE detects that the PDSCH signal is transmitted in the cells which allocate the CSI-RS resources included in the measurement set (information on a cell transmitting a PDSCH signal=11). The RRC message in Table 3 includes at least one of the following six pieces of information:

1. a Cell-ID;
2. MBSFN SCI;
3. the number of CRS ports;
4. CRS resource position information;
5. a sub-frame index difference value between a sub-frame index used in a serving cell and a sub-frame index used in a related cell; and
6. the number of OFDM symbols used for a control channel.

The UE detects MBSFN SCI for cells in which a PDSCH signal is transmitted in a scheduled sub-frame in step 1015. The UE detects a CRS resource position of cells in which the scheduled sub-frame is set as a normal sub-frame among the cells in which the PDSCH signal is transmitted in the scheduled sub-frame in step 1017. The UE detects cells in which a SYNC signal or a PBCH signal is transmitted in the scheduled sub-frame among the cells in which the PDSCH signal is transmitted in the scheduled sub-frame in step 1019. The UE detects downlink data by receiving the PDSCH signal through resources except for a CRS resource, a SYNC signal resource, a PBCH resource, a CSI-RS resource, and a DM-RS resource in step 1021.

In FIG. 10, it is assumed that the UE may detect a transmission timing of the SYNC signal and the PBCH signal for the cells except for the serving cell.

However, the UE may not detect the transmission timing of the SYNC signal and the PBCH signal for the cells except for the serving cell. In this case, the UE receives the PDSCH signal by considering a transmission timing of the SYNC signal and the PBCH signal for the serving cell.

Exemplary Embodiment #3

Figure 11:
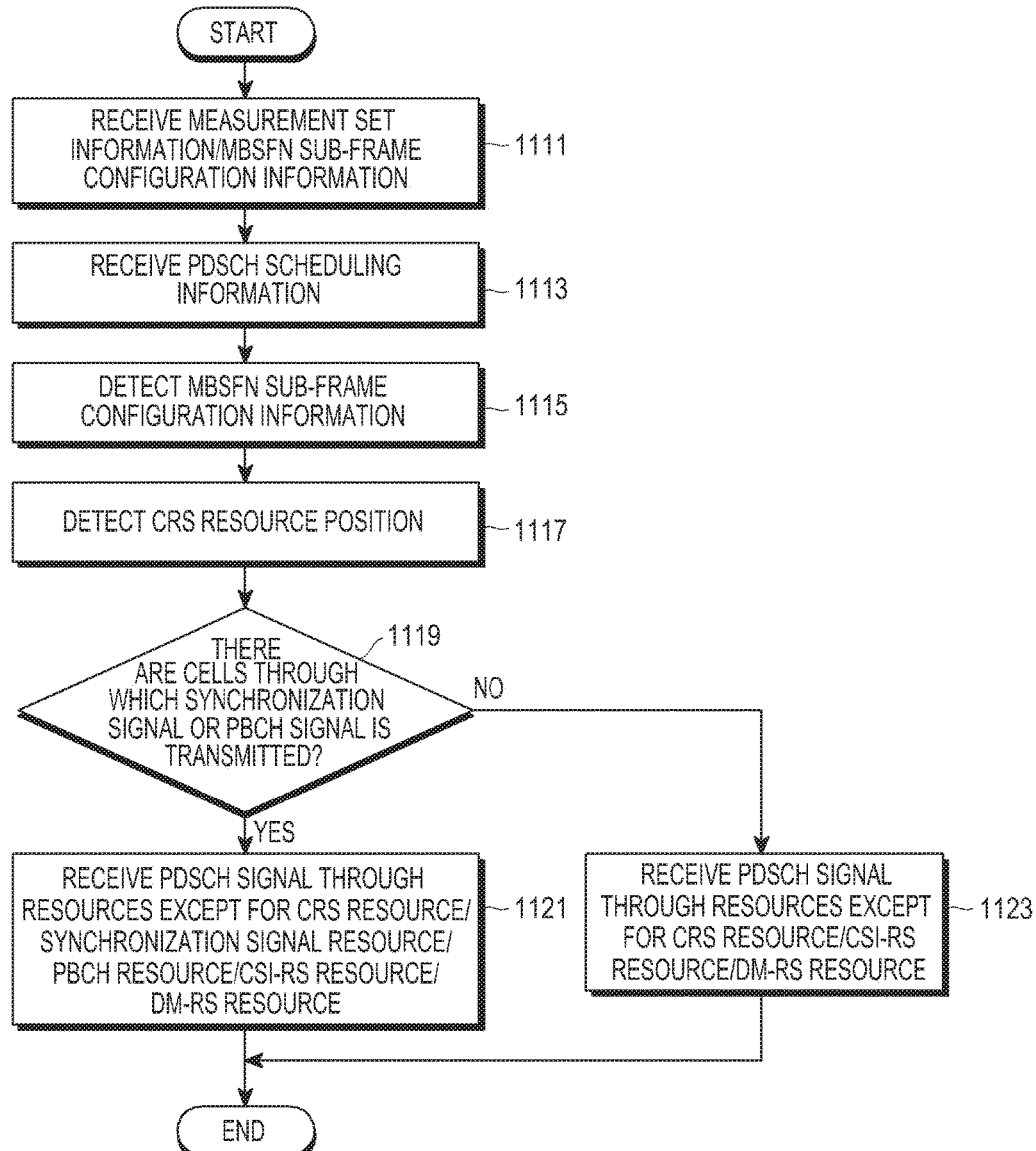
FIG. 11 is a flowchart illustrating a method for receiving a PDSCH signal in a UE in a cellular radio communication system using a CoMP scheme according to an exemplary embodiment #3 of the present invention.

FIG. 11 is a flowchart illustrating a method for receiving a PDSCH signal in a UE in a cellular radio communication system using a CoMP scheme according to an exemplary embodiment #3 of the present invention.

Prior to a description for FIG. 11, in the exemplary embodiment #3 of the present invention, a UE receives a PDSCH signal through remaining resources except for all CRS resources, a SYNC signal resource and a PBCH resource after detecting MBSFN SCI for cells which allocate CSI-RS resources included in a measurement set.

Referring to FIG. 11, a UE receives MSI and MBSFN SCI of cells which allocate CSI-RS resources included in a measurement set from a BS in step 1111. The BS transmits MBSFN SCI for each cell as described before with reference to the exemplary embodiment #1 of the present invention, so a detailed description thereof will be omitted herein. The UE receives PDSCH scheduling information through a PDCCH from the BS in step 1113. The UE detects MBSFN SCI of the cells which allocate the CSI-RS resources included in the measurement set in a scheduled sub-frame in step 1115.

The UE detects a position of a CRS resource of each cell of which the scheduled sub-frame is set as a normal sub-frame among the cells which allocate the CSI-RS resources included in the measurement set in step 1117. That is, the UE detects that a PDSCH signal is not transmitted at positions of all CRS resources of each cell of which the scheduled sub-frame is set as the normal sub-frame among the cells which allocate the CSI-RS resources included in the measurement set.

The BS may transmit information on a position of a CRS resource allocated in a cell different from a serving cell with MSI to the UE, and the operation of transmitting the CRS resource position information is described below.

Firstly, the BS may transmit the information on the position of the CRS resource allocated in the cell different from the serving cell by transmitting Cell-IDs used in cells which allocate each CSI-RS resource to the UE.

Secondly, the BS may transmit the information on the position of the CRS resource allocated in the cell different from the serving cell by transmitting a start position of a CRS resource to the UE.

Thirdly, the BS may transmit the information on the position of the CRS resource allocated in the cell different from the serving cell by transmitting the number of CRS ports with the MSI. In this case, the UE may detect the position of the CRS resource by assuming that cells except for the serving cell always use 4 CRS ports.

Meanwhile, the UE determines whether there are cells in which a SYNC signal or a PBCH signal is transmitted in the scheduled sub-frame among the cells which allocate the CSI-RS resources included in the measurement set in step 1119.

If there are cells in which the SYNC signal or the PBCH signal is transmitted in the scheduled sub-frame among the cells which allocate the CSI-RS resources included in the measurement set, the UE detects downlink data by receiving the PDSCH signal through resources except for a CRS resource, a SYNC signal resource, a PBCH resource, a CSI-RS resource, and a DM-RS resource in step 1121.

If there are no cells in which the SYNC signal or the PBCH signal is transmitted in the scheduled sub-frame among the cells which allocate the CSI-RS resources included in the measurement set, the UE detects downlink data by receiving the PDSCH signal through resources except for a CRS resource, a CSI-RS resource, and a DM-RS resource in step 1123.

In FIG. 11, it is assumed that the UE may detect a transmission timing of the SYNC signal and the PBCH signal for the cells except for the serving cell.

However, the UE may not detect the transmission timing of the SYNC signal and the PBCH signal for the cells except for the serving cell. In this case, step 1119 may be modified as a step in which the UE determines whether a SYNC signal transmission or a PBCH signal transmission occurs in a related sub-frame of the serving cell. That is, the UE receives the PDSCH signal by considering a transmission timing of the SYNC signal and the PBCH signal for the serving cell if the UE may not detect the transmission timing of the SYNC signal and the PBCH signal for the cells except for the serving cell.

Exemplary Embodiment #4

Figure 12:
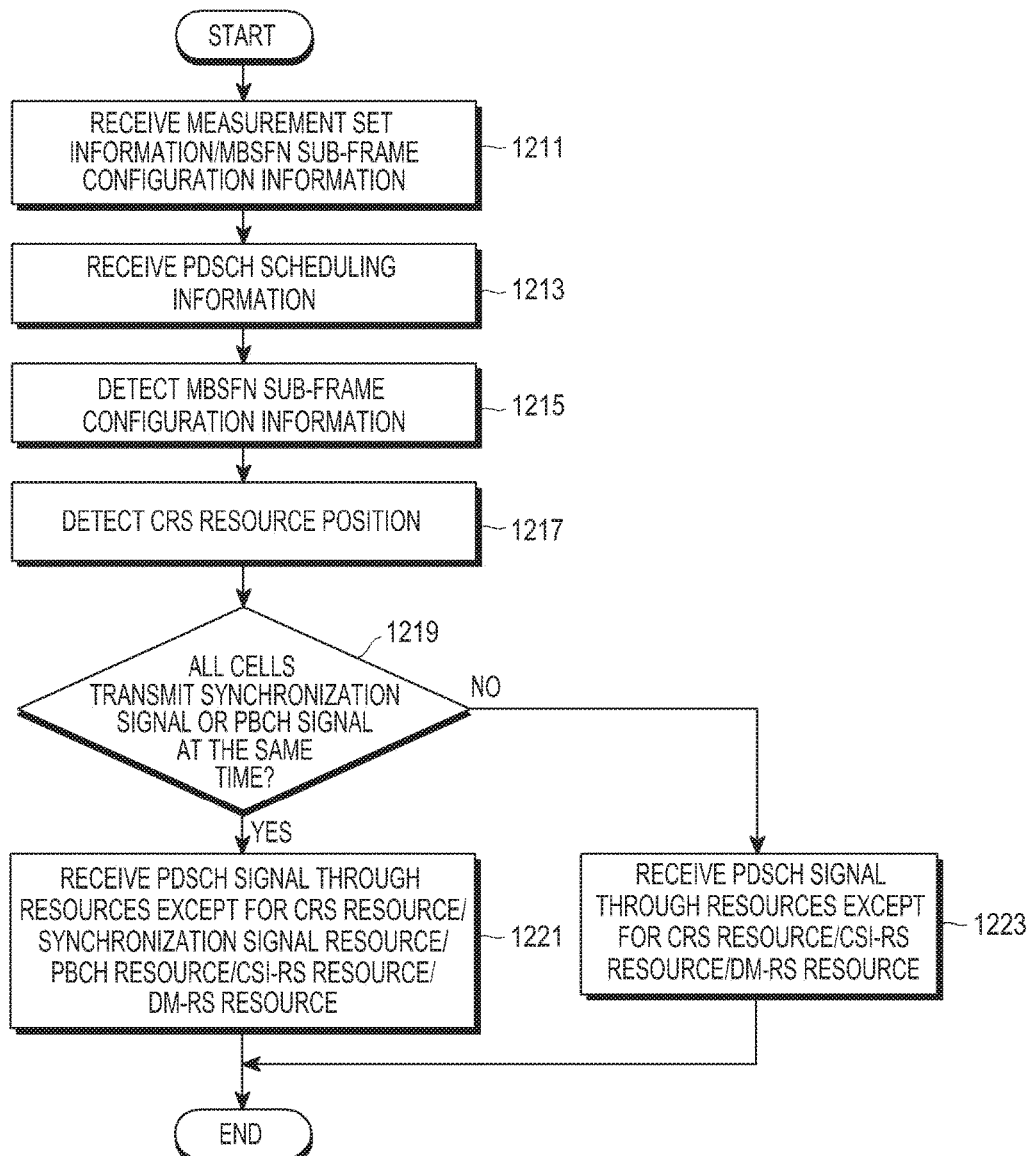
FIG. 12 is a flowchart illustrating a method for receiving a PDSCH signal in a UE in a cellular radio communication system using a CoMP scheme according to an exemplary embodiment #4 of the present invention.

FIG. 12 is a flowchart illustrating a method for receiving a PDSCH signal in a UE in a cellular radio communication system using a CoMP scheme according to an exemplary embodiment #4 of the present invention.

Prior to a description for FIG. 12, in the exemplary embodiment #4 of the present invention, a UE excludes all available CRS resources from resources through which the UE receives a PDSCH signal after detecting MBSFN SCI for cells which allocate CSI-RS resources included in a measurement set. The UE excludes a SYNC signal resource and a PBCH resource from the resources through which the UE receives the PDSCH signal only if all of the cells which allocate CSI-RS resources included in the measurement set transmit a SYNC signal and a PBCH signal at the same time. If at least one of the cells which allocate CSI-RS resources included in the measurement set does not transmit the SYNC signal and the PBCH signal, the UE receives the PDSCH signal through a related SYNC signal resource and PBCH resource without excluding a related resource, i.e., the SYNC signal resource and the PBCH resource from the resources through which the UE receives the PDSCH signal.

Referring to FIG. 12, a UE receives MSI and MBSFN SCI of cells which allocate CSI-RS resources included in a measurement set from a BS in step 1211. The BS transmits MBSFN SCI for each cell as described before with reference to the exemplary embodiment #1 of the present invention, so a detailed description thereof will be omitted herein.

The UE receives PDSCH scheduling information through a PDCCH from the BS in step 1213. The UE detects MBSFN SCI of the cells which allocate the CSI-RS resources included in the measurement set in a scheduled sub-frame in step 1215. The UE detects a position of a CRS resource of each cell of which the scheduled sub-frame is set as a normal sub-frame among the cells which allocate the CSI-RS resources included in the measurement set in step 1217. That is, the UE detects that a PDSCH signal is not transmitted at positions of all CRS resources of each cell of which the scheduled sub-frame is set as the normal sub-frame among the cells which allocate the CSI-RS resources included in the measurement set. The BS may transmit information on a position of a CRS resource allocated in a cell different from a serving cell with MSI to the UE, and the operation of transmitting the CRS resource position information is described below.

Firstly, the BS may transmit the information on the position of the CRS resource allocated in the cell different from the serving cell by transmitting Cell-IDs used in cells which allocate each CSI-RS resource to the UE.

Secondly, the BS may transmit the information on the position of the CRS resource allocated in the cell different from the serving cell by transmitting start position information of a CRS resource to the UE.

Thirdly, the BS may transmit the information on the position of the CRS resource allocated in the cell different from the serving cell by transmitting the number of CRS ports with the MSI. In this case, the UE may detect the position of the CRS resource by assuming that cells except for the serving cell always use 4 CRS ports.

Meanwhile, the UE determines whether all cells which allocate the CSI-RS resources included in the measurement set transmit a SYNC signal or a PBCH signal in the scheduled sub-frame at the same time in step 1219.

If all the cells which allocate the CSI-RS resources included in the measurement set transmit the SYNC signal or the PBCH signal in the scheduled sub-frame at the same time, the UE detects downlink data by receiving the PDSCH signal through resources except for a CRS resource, a SYNC signal resource, a PBCH resource, a CSI-RS resource, and a DM-RS resource in step 1221.

If all the cells which allocate the CSI-RS resources included in the measurement set do not transmit the SYNC signal or the PBCH signal in the scheduled sub-frame at the same time, that is, if at least one of all the cells which allocate the CSI-RS resources included in the measurement set does not transmit the SYNC signal or the PBCH signal in the scheduled sub-frame, the UE detects downlink data by receiving the PDSCH signal through resources except for a CRS resource, a CSI-RS resource, and a DM-RS resource in step 1223.

In FIG. 12, it is assumed that the UE may detect a transmission timing of the SYNC signal and the PBCH signal for the cells except for the serving cell.

However, the UE may not detect the transmission timing of the SYNC signal and the PBCH signal for the cells except for the serving cell. In this case, step 1219 may be modified as a step in which the UE determines whether a SYNC signal transmission or a PBCH signal transmission occurs in a related sub-frame of the serving cell. That is, the UE receives the PDSCH signal by considering a transmission timing of the SYNC signal and the PBCH signal for the serving cell if the UE may not detect the transmission timing of the SYNC signal and the PBCH signal for the cells except for the serving cell.

Exemplary Embodiment #5

Figure 13:
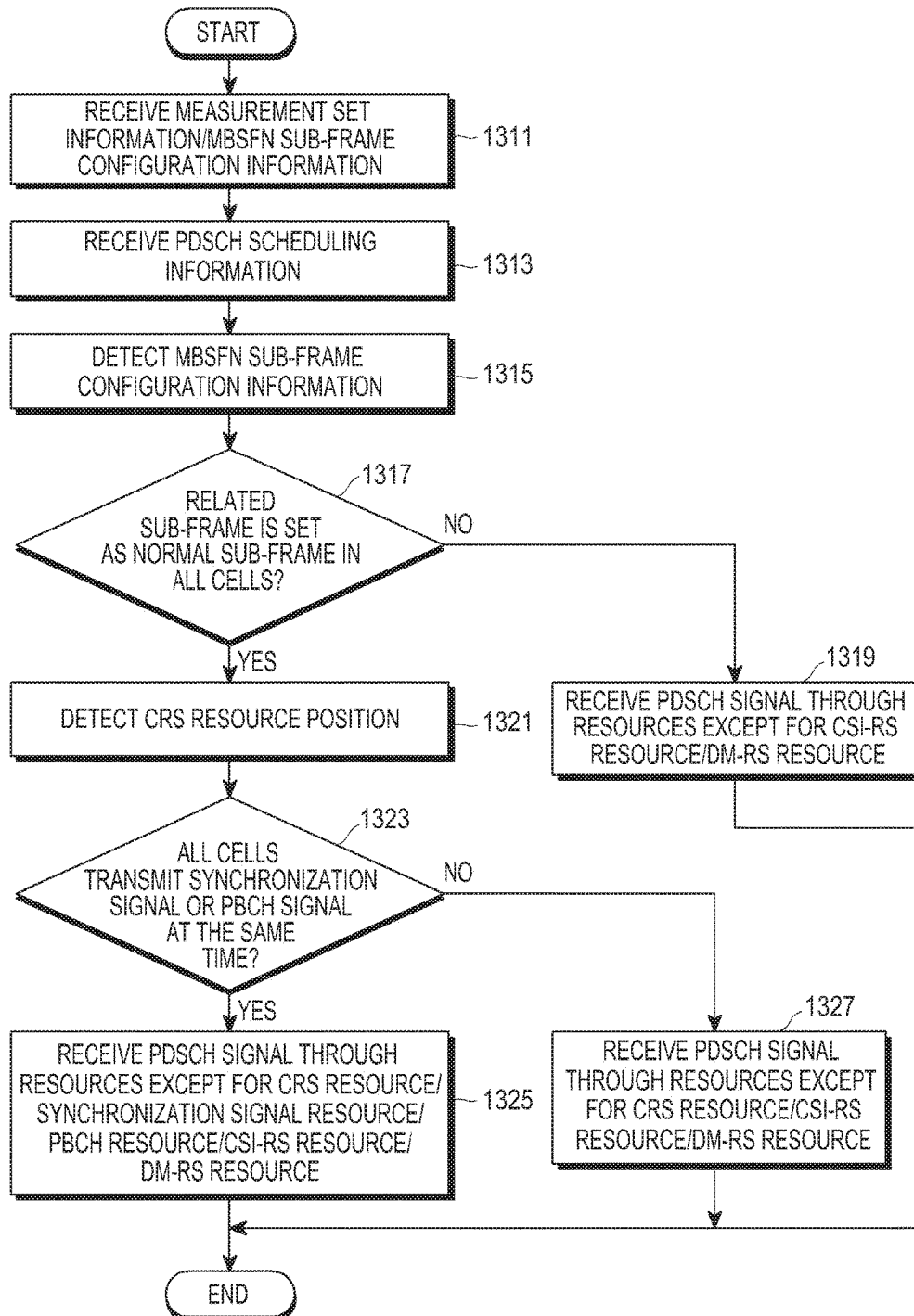
FIG. 13 is a flowchart illustrating a method for receiving a PDSCH signal in a UE in a cellular radio communication system using a CoMP scheme according to an exemplary embodiment #5 of the present invention.

FIG. 13 is a flowchart illustrating a method for receiving a PDSCH signal in a UE in a cellular radio communication system using a CoMP scheme according to an exemplary embodiment #5 of the present invention.

Prior to a description for FIG. 13, in the exemplary embodiment #5 of the present invention, a UE receives a PDSCH signal without considering a CRS resource if a related sub-frame is set as an MBSFN sub-frame in at least one cell after detecting MBSFN SCI for cells which allocate CSI-RS resources included in a measurement set.

The UE excludes a SYNC signal resource and a PBCH resource from a PDSCH resource only if all of the cells which allocate the CSI-RS resources included in the measurement set transmit a SYNC signal and a PBCH signal at the same time, and receives a PDSCH signal without considering a related resource if at least one of the cells which allocate the CSI-RS resources included in the measurement set does not transmit the SYNC signal and the PBCH signal. So, the UE receives the PDSCH signal through a cell which allocates maximum resources upon receiving the PDSCH signal based on the exemplary embodiment #5 of the present invention.

Referring to FIG. 13, a UE receives MSI and MBSFN SCI of cells which allocate CSI-RS resources included in a measurement set from a BS in step 1311. The BS transmits MBSFN SCI for each cell as described before with reference to the exemplary embodiment #1 of the present invention, so a detailed description thereof will be omitted herein. The UE receives PDSCH scheduling information through a PDCCH from the BS in step 1313. The UE detects MBSFN SCI of the cells which allocate the CSI-RS resources included in the measurement set in a scheduled sub-frame in step 1315.

The UE determines whether a related sub-frame is set as a normal sub-frame in all cells which allocate the CSI-RS resources included in the measurement set in step 1317. If the related sub-frame is not set as the normal sub-frame in all the cells which allocate the CSI-RS resources included in the measurement set, the UE detects downlink data by receiving a PDSCH signal through resources except for a CSI-RS resource and a DM-RS resource in step 1319.

If the related sub-frame is set as the normal sub-frame in all the cells which allocate the CSI-RS resources included in the measurement set, the UE detects positions of CRS resources of all the cells which allocate the CSI-RS resources included in the measurement set in step 1321. That is, the UE detects that the PDSCH signal is not transmitted through the CRS resources of all the cells which allocate the CSI-RS resources included in the measurement set. The BS may transmit information on a position of a CRS resource allocated in a cell different from a serving cell with MSI to the UE, and the operation of transmitting the CRS resource position information is described below.

Firstly, the BS may transmit the information on the position of the CRS resource allocated in the cell different from the serving cell by transmitting Cell-IDs used in cells which allocate each CSI-RS resource to the UE.

Secondly, the BS may transmit the information on the position of the CRS resource allocated in the cell different from the serving cell by transmitting start position information of a CRS resource to the UE.

Thirdly, the BS may transmit the information on the position of the CRS resource allocated in the cell different from the serving cell by transmitting the number of CRS ports with the MSI. In this case, the UE may detect the position of the CRS resource by assuming that cells except for the serving cell always use 4 CRS ports.

Meanwhile, the UE determines whether all cells which allocate the CSI-RS resources included in the measurement set transmit a SYNC signal or a PBCH signal in the scheduled sub-frame at the same time in step 1323.

If all the cells which allocate the CSI-RS resources included in the measurement set transmit the SYNC signal or the PBCH signal in the scheduled sub-frame at the same time, the UE detects downlink data by receiving the PDSCH signal through resources except for a CRS resource, a SYNC signal resource, a PBCH resource, a CSI-RS resource, and a DM-RS resource in step 1325.

If all the cells which allocate the CSI-RS resources included in the measurement set do not transmit the SYNC signal or the PBCH signal in the scheduled sub-frame at the same time, that is, if at least one of all the cells which allocate the CSI-RS resources included in the measurement set does not transmit the SYNC signal or the PBCH signal in the scheduled sub-frame, the UE detects downlink data by receiving the PDSCH signal through resources except for a CRS resource, a CSI-RS resource, and a DM-RS resource in step 1327.

In FIG. 13, it is assumed that the UE may detect a transmission timing of the SYNC signal and the PBCH signal for the cells except for the serving cell.

However, the UE may not detect the transmission timing of the SYNC signal and the PBCH signal for the cells except for the serving cell. In this case, step 1323 may be modified as a step in which the UE determines whether a SYNC signal transmission or a PBCH signal transmission occurs in a related sub-frame of the serving cell. That is, the UE receives the PDSCH signal by considering a transmission timing of the SYNC signal and the PBCH signal for the serving cell if the UE may not detect the transmission timing of the SYNC signal and the PBCH signal for the cells except for the serving cell.

Exemplary Embodiment #6

Figure 14:
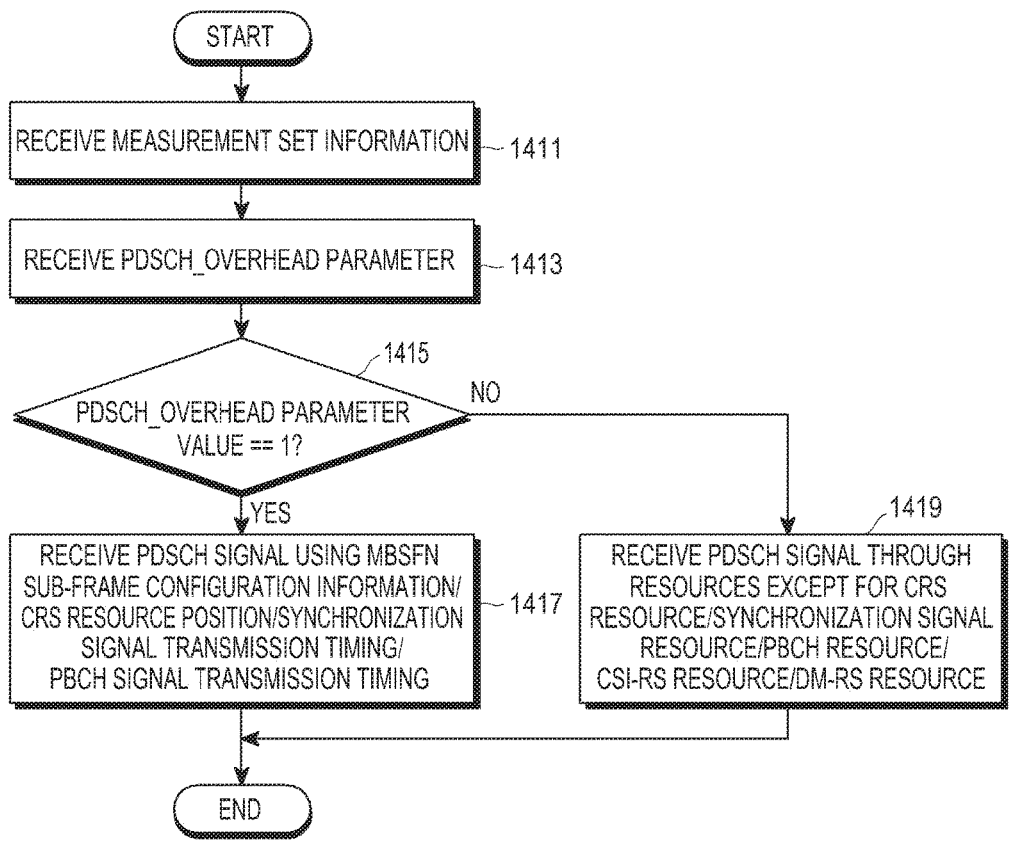
FIG. 14 is a flowchart illustrating a method for receiving a PDSCH signal in a UE in a cellular radio communication system using a CoMP scheme according to an exemplary embodiment #6 of the present invention.

FIG. 14 is a flowchart illustrating a method for receiving a PDSCH signal in a UE in a cellular radio communication system using a CoMP scheme according to an exemplary embodiment #6 of the present invention.

Prior to a description for FIG. 14, in the exemplary embodiment #1 to the exemplary embodiment #5 of the present invention, a UE receives a PDSCH signal by considering a DS scheme, a DS/DB scheme, and a JT scheme in which cells from which the UE receives the PDSCH signal are dynamically changed. However, in the exemplary embodiment #6 of the present invention, the UE receives the PDSCH signal by considering a CS/CB scheme in which the UE receives the PDSCH signal from a serving cell as well as the DS scheme, the DS/DB scheme, and the JT scheme.

So, in the exemplary embodiment #6 of the present invention, a BS transmits a PDSCH_OVERHEAD parameter as a parameter indicating whether a CRS resource, a SYNC signal resource or a PBCH resource which are allocated in cells except for a serving cell among cells which allocate CSI-RS resources included in a measurement set are included in a resource through which a UE receives the PDSCH signal to a UE using a RRC message. The RRC message including the PDSCH_OVERHEAD parameter may be implemented as a new RRC message or an RRC message of the related art. A detailed description of the RRC message including the PDSCH_OVERHEAD parameter will be omitted herein for brevity. The UE determines a resource through which the UE receives the PDSCH signal based on a value of the PDSCH_OVERHEAD parameter.

Here, the PDSCH_OVERHEAD parameter may be implemented with 1 bit. For example, a value of the PDSCH_OVERHEAD parameter '1(ON)' indicates that a CRS resource, a SYNC signal resource, or a PBCH resource allocated in cells different from a serving cell are included in resources through which the UE receives a PDSCH signal. On the other hand, a value of the PDSCH_OVERHEAD parameter '0(OFF)' indicates that a CRS resource, a SYNC signal resource, or a PBCH resource allocated in a serving cell are included in the resources through which the UE receives the PDSCH signal. That is, the value of the PDSCH_OVERHEAD parameter '1' indicates that the UE receives the PDSCH signal using one of the PDSCH signal reception methods described in the exemplary embodiment #1 to the exemplary embodiment #5 of the present invention. On the other hand, the value of the PDSCH_OVERHEAD parameter '0' indicates that the UE receives the PDSCH signal by considering the serving cell unlike the exemplary embodiment #1 to the exemplary embodiment #5 of the present invention.

Referring to FIG. 14, a UE receives MSI from a BS in step 1411. The UE receives a PDSCH_OVERHEAD parameter from the BS in step 1413. The UE determines whether a value of the PDSCH_OVERHEAD parameter is set as 1 (a PDSCH_OVERHEAD parameter value=1) in step 1415. If the value of the PDSCH_OVERHEAD parameter is set as 1, the UE detects downlink data by receiving a PDSCH signal using MBSFN SCI, a position of a CRS resource, a transmission timing of a SYNC signal, and a transmission timing of a PBCH signal for the cells which allocate the CSI-RS resources included in the measurement set as described before with reference to one of the exemplary embodiment #1 to the exemplary embodiment #5 of the present invention in step 1417.

If the value of the PDSCH_OVERHEAD parameter is not set as 1, that is, if the value of the PDSCH_OVERHEAD parameter is set as 0, the UE detects MBSFN SCI, a position of a CRS resource, a transmission timing of a SYNC signal, and a transmission timing of a PBCH signal for a serving cell, and detects downlink data by receiving a PDSCH signal through resources except for a related CRS resource, SYNC signal resource, PBCH resource, CSI-RS resource, and DM-RS resource in step 1419.

Exemplary Embodiment #7

Figure 15:
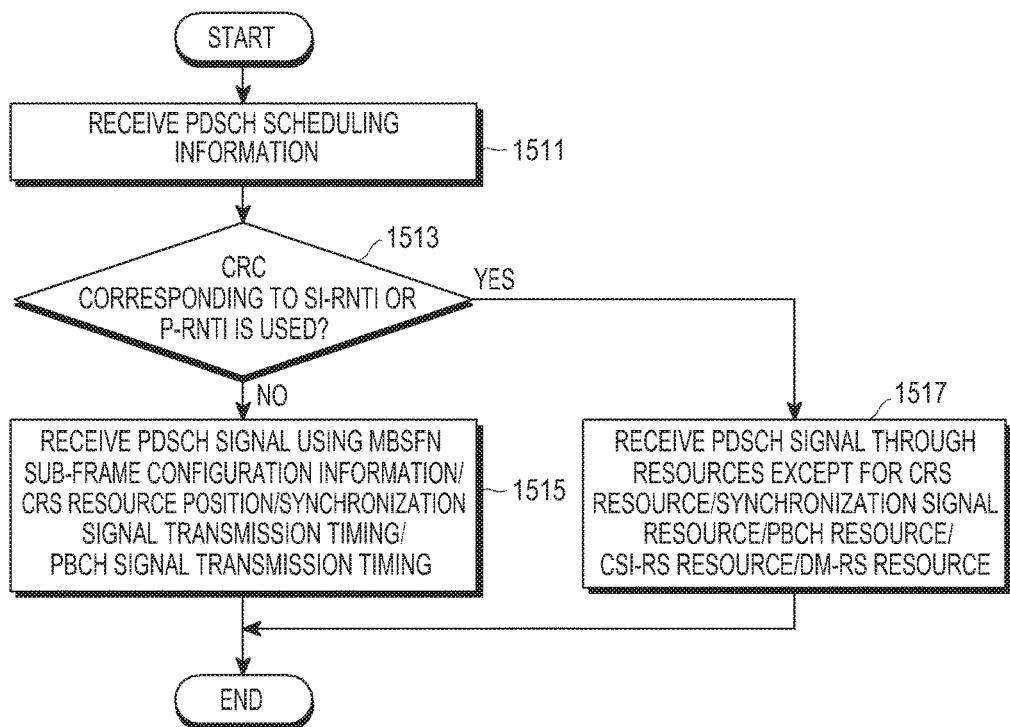
FIG. 15 is a flowchart illustrating a method for receiving a PDSCH signal in a UE in a cellular radio communication system using a CoMP scheme according to an exemplary embodiment #7 of the present invention.

FIG. 15 is a flowchart illustrating a method for receiving a PDSCH signal in a UE in a cellular radio communication system using a CoMP scheme according to an exemplary embodiment #7 of the present invention.

Prior to a description for FIG. 15, in the embodiment #1 to the exemplary embodiment #6 of the present invention, a system information reception or a paging information reception for a UE using an LTE scheme of the related art is not considered. However, in the exemplary embodiment #7 of the present invention, a UE receives a PDSCH signal by considering the system information reception or the paging information reception for the UE using the LTE scheme of the related art.

In the exemplary embodiment #7 of the present invention, a BS uses a PDSCH signal transmission method for a serving cell defined in the LTE scheme of the related art if the BS transmits system information or paging information.

On the other hand, the BS determines resources through which the BS transmits a PDSCH signal by considering a CRS resource, a SYNC signal resource, and a PBCH resource allocated in cells different from a serving cell as well as the serving cell as described in the exemplary embodiment #1 to the exemplary embodiment #6 of the present invention. The BS generates a related PDCCH by adding a Cyclic Redundancy Check (CRC) generated using an SI-RNTI used in an LTE mobile communication system to related scheduling information in order to schedule a transmission of a PDSCH signal including system information, and uses a CRC generated using a P-RNTI used in the LTE mobile communication system in order to schedule a transmission of a PDSCH signal including paging information.

Referring to FIG. 15, a UE receives PDSCH scheduling information through a PDCCH from a BS in step 1511. The UE determines whether the BS uses a CRC corresponding to an SI-RNTI or a P-RNTI for the PDCCH transmission in step 1513. If the BS does not use the CRC corresponding to the SI-RNTI or the P-RNTI for the PDCCH transmission, the UE detects downlink data by receiving a PDSCH signal using MBSFN SCI, a position of a CRS resource, a transmission timing of a SYNC signal, and a transmission timing of a PBCH signal for cells which allocate CSI-RS resources included in a measurement set as described before with reference to one of the exemplary embodiment #1 to the exemplary embodiment #6 of the present invention in step 1515.

If the BS uses the CRC corresponding to the SI-RNTI or the P-RNTI for the PDCCH transmission, the UE detects MBSFN SCI, a position of a CRS resource, a transmission timing of a SYNC signal, and a transmission timing of a PBCH signal for a serving cell, and detects downlink data by receiving the PDSCH signal through resources except for a related CRS resource, SYNC signal resource, PBCH resource, CSI-RS resource, and DM-RS resource in step 1517.

Exemplary Embodiment #8

In the exemplary embodiment #8 of the present invention, a UE detects a current PDSCH resource mapping scheme by interpreting a specific DCI format included in dynamic scheduling information transmitted through a PDCCH, and detects downlink data by receiving a PDSCH signal based on the detected PDSCH resource mapping scheme. The specific DCI format may notify at least one of the following three pieces of CoMP scheme associated-scheduling information with a PDSCH resource mapping scheme:
  DM-RS sequence information for a PDSCH signal reception;
  an OFDM symbol position at which the a PDSCH signal reception should be started (or the number of OFDM symbols used for a control channel (e.g., a PDCCH) signal transmission); and
  a relationship between a cell through which a PDSCH signal is transmitted and a CSI-RS.

The three pieces of CoMP scheme associated-scheduling information and the PDSCH resource mapping scheme may be changed corresponding to a cell through which a PDSCH signal is transmitted, so the three pieces of CoMP scheme associated-scheduling information and the PDSCH resource mapping scheme may be carried through the same DCI format at the same time.

In an LTE mobile communication system, the DM-RS sequence information is dynamically determined according to an $n_{SCID}$ value, and one of two sequences configured by a RRC message is applied as a DM-RS sequence in order to receive a related PDSCH signal if the $n_{SCID}$ value is set as '0' or '1'. For example, the $n_{SCID}$ value is determined through a DCI format implemented with 3 bits, and thus 8 states are possible as defined in Table 4. That is, the UE may use 2 DM-RS sequences, one codeword is transmitted if a specific PDSCH signal is transmitted, two codewords are transmitted if a related DCI format indicates a state #1 and a state #3, a DM-RS sequence corresponding to an $n_{SCID}$ value '1' is used if the related DCI format indicates the state #1, and a DM-RS sequence corresponding to an $n_{SCID}$ value '0' is used if the related DCI format indicates other states.

TABLE 4

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID}$ = 0 | 0 | 2 layer, ports 7-8, $n_{SCID}$ = 0 |
| 1 | 1 layer, port 7, $n_{SCID}$ = 1 | 1 | 2 layer, ports 7-8, $n_{SCID}$ = 1 |
| 2 | 1 layer, port 8, $n_{SCID}$ = 0 | 2 | 3 layer, ports 7-9 |
| 3 | 1 layer, port 8, $n_{SCID}$ = 1 | 3 | 4 layer, ports 7-10 |
| 4 | 2 layer, ports 7-8 | 4 | 5 layer, ports 7-11 |
| 5 | 2 layer, ports 7-9 | 5 | 6 layer, ports 7-12 |
| 6 | 2 layer, ports 7-10 | 6 | 7 layer, ports 7-13 |
| 7 | Reserved | 7 | 8 layer, ports 7-14 |

In Table 5, a DM-RS sequence configuration scheme of a BS and a UE according to an $n_{SCID}$ value is expressed.

TABLE 5

| $n_{SCID}$ | DM-RS sequence configuration |
| --- | --- |
| 0 | the first DM-RS sequence configured by a RRC message |
| 1 | the second DM-RS sequence configured by a RRC message |

Further, the UE may detect CRS resource positions for each cell through the following parameters in order to detect available PDSCH resources upon considering a DS scheme and a JT scheme in which cells through which the UE receives a PDSCH signal are dynamically changed. The parameters include:
1. vshift (=PCID mod 6) or Physical Cell-ID (PCID);
2. MBSFN SCI; and
3. the number of CRS antenna ports.

So, the BS transmits DM-RS sequence configuration information for a PDSCH signal reception and information on a position of a PDSCH resource allocable according to a position of a CRS resource for each cell at the same time as described in Table 6, thereby the UE may dynamically detect DM-RS sequence configuration information and a position of a PDSCH resource according to the $n_{SCID}$ value. That is, if the $n_{SCID}$ value is set as '0', the UE sets the first DM-RS sequence configured by a RRC message, and detects that a PDSCH signal is transmitted through resources except for a related CRS resource by detecting position information on the first CRS resource configured by the RRC message.

If the $n_{SCID}$ value is set as '1', the UE detects the second DM-RS sequence configuration information and CRS resource position configuration information configured by the RRC message.

TABLE 6

| $n_{SCID}$ | DM-RS sequence configuration | CRS resource position configuration |
| --- | --- | --- |
| 0 | $1^{st}$ DM-RS sequence configured by RRC | $1^{st}$ set of [$v_{shift}$ (or PCID), MBSFN configuration, and # of CRS antenna ports] configured by RRC |
| 1 | $2^{nd}$ DM-RS sequence configured by RRC | $2^{nd}$ set of [$v_{shift}$ (or PCID), MBSFN configuration, and # of CRS antenna ports] configured by RRC |

In order to enable the UE to receive a PDSCH signal from more than 2 cells in the cellular radio communication system using the CoMP scheme, the BS should notify the UE of additional CRS resource position configuration information as well as the two types of CRS resource position configuration information, so the BS may consider an additional bit as well as the $n_{SCID}$ value as expressed in Table 7. That is, the DM-RS sequence configuration is notified using the $n_{SCID}$ value, the UE may detect one of 4 types of CRS resource position configuration information using the additional 1 bit. Upon using DM-RS sequence configuration information and CRS resource position configuration information expressed in Table 7, the BS may notify the UE of a change of a PDSCH resource even though the BS transmits a PDSCH signal using more than 3 layers compared with Table 6.

TABLE 7

| $n_{SCID}$ | additional bit | DM-RS sequence configuration | CRS resource position configuration |
| --- | --- | --- | --- |
| 0 | 0 | $1^{st}$ DM-RS sequence configured by RRC | $1^{st}$ set of [$v_{shift}$ (or PCID), MBSFN configuration, and # of CRS |
| 0 | 1 | $1^{st}$ DM-RS sequence configured by RRC | $2^{nd}$ set of [$v_{shift}$ (or PCID), MBSFN configuration, and # of CRS antenna ports] configured by RRC |
| 1 | 0 | $2^{nd}$ DM-RS sequence configured by RRC | $3^{rd}$ set of [$v_{shift}$ (or PCID), MBSFN configuration, and # of CRS antenna ports] configured by RRC |
| 1 | 1 | $2^{nd}$ DM-RS sequence configured by RRC | $4^{th}$ set of [$v_{shift}$ (or PCID), MBSFN configuration, and # of CRS antenna ports] configured by RRC |

Meanwhile, available PDSCH resources are influenced by the number of OFDM symbols used for a PDCCH signal transmission as well as a CRS resource position. In an LTE mobile communication system, the first to the third OFDM symbols in one sub-frame may be used for the PDCCH signal transmission and the number of the used OFDM symbols may be transmitted to a UE through a Physical Control Format Indication Channel (PCFICH). The number of the used OFDM symbols may be different for each cell, so the UE may detect a PCFICH for a cell which the UE accesses, i.e., a serving cell. However, it is difficult for the UE to detect PCFICHs for neighbor cells.

So, a UE using a DS scheme or a JT scheme should adjust a start position of OFDM symbols used for the PDSCH signal transmission corresponding to a cell through which the UE receives the PDSCH signal. In this case, a RRC message used for transmitting the start position of the OFDM symbols includes one of the following 4 pieces of information, and the UE may set the start position of the OFDM symbols using the one of the following 4 pieces of information. The 4 pieces of information include:
 1. information 1: a position of an OFDM symbol, used in a cell which a UE accesses, in which a PDSCH signal transmission starts;
 2. information 2: the second OFDM symbol;
 3. information 3: the third OFDM symbol; and
 4. information 4: the fourth OFDM symbol.

If the RRC message includes the information 1, the UE may receive a PDSCH signal corresponding to PDSCH signal transmission start position information set by detecting a PCFICH or using another RRC message for a Carrier Aggregation (CA) scheme.

If the RRC message includes one of the information 2 to the information 4, the UE may ignore the PDSCH signal transmission start position information set by detecting the PCFICH or using another RRC message for the CA scheme and receive the PDSCH signal corresponding to the RRC message.

If PDSCH signal transmission start position configuration information indicating a PDSCH signal transmission start position is added to the DM-RS sequence configuration information and the CRS resource position configuration information as expressed in Table 6, a UE may detect DM-RS sequence configuration information and resources available for a PDSCH signal transmission according to an $n_{SCID}$ value as expressed in Table 8. If the $n_{SCID}$ value is set as 0, the UE may detect DM-RS sequence configuration information and PDSCH resource configuration information according to the first DM-RS sequence configuration information, the first CRS resource position configuration information, and the first PDSCH signal transmission start position configured by a RRC message.

If the $n_{SCID}$ value is set as 1, the UE may detect DM-RS sequence configuration information and PDSCH resource configuration information according to the second DM-RS sequence configuration information, the second CRS resource position configuration information, and the second PDSCH signal transmission start position configured by the RRC message.

TABLE 8

| $n_{SCID}$ | DM-RS sequence configuration | CRS resource position configuration | PDSCH transmission start position (OFDM symbol position) configuration |
|---|---|---|---|
| 0 | 1st DM-RS sequence configured by RRC | 1st set of [$v_{shift}$ (or PCID), MBSFN configuration, and # of CRS antenna ports] configured by RRC | 1st RRC configuration for PDSCH starting OFDM symbol |
| 1 | 2nd DM-RS sequence configured by RRC | 2nd set of [$v_{shift}$ (or PCID), MBSFN configuration, and # of CRS antenna ports] configured by RRC | 2nd RRC configuration for PDSCH starting OFDM symbol |

If PDSCH signal transmission start position configuration information is added to the DM-RS sequence configuration information and the CRS resource position configuration information as expressed in Table 7, a UE may detect DM-RS sequence configuration information and PDSCH signal transmission start information according to an $n_{SCID}$ value and an additional bit as expressed in Table 9.

TABLE 9

| $n_{SCID}$ | additional bit | DM-RS sequence configuration | CRS resource position configuration | PDSCH transmission start position (OFDM symbol position) configuration |
|---|---|---|---|---|
| 0 | 0 | 1st DM-RS sequence configured by RRC | 1st set of [$v_{shift}$ (or PCID), MBSFN configuration, and # of CRS antenna ports] configured by RRC | 1st RRC configuration for PDSCH starting OFDM symbol |
| 0 | 1 | 1st DM-RS sequence configured by RRC | 2nd set of [$v_{shift}$ (or PCID), MBSFN configuration, and # of CRS antenna ports] configured by RRC | 2nd RRC configuration for PDSCH starting OFDM symbol |
| 1 | 0 | 2nd DM-RS sequence configured by RRC | 3rd set of [$v_{shift}$ (or PCID), MBSFN configuration, and # of CRS antenna ports] configured by RRC | 3rd RRC configuration for PDSCH starting OFDM symbol |
| 1 | 1 | 2nd DM-RS sequence configured by RRC | 4th set of [$v_{shift}$ (or PCID), MBSFN configuration, and # of CRS antenna ports] configured by RRC | 4th RRC configuration for PDSCH starting OFDM symbol |

As described above, information indicating a relationship between a cell through which a PDSCH signal is transmitted and a CSI-RS may be carried with DM-RS sequence configuration information, CRS resource position configuration information, and PDSCH transmission start position configuration information to a UE. If the UE may detect the relationship between the cell through which the PDSCH signal is transmitted and the CSI-RS, DM-RS channel estimation performance may be improved using channel information estimated through a specific CSI-RS upon estimating a DM-RS channel for a PDSCH signal detection.

Here, the parameter indicating the relationship between the cell through which the PDSCH signal is transmitted and the CSI-RS is transmitted through a RRC message, and may include one of the following 4 parameters. The 4 parameters include:
1. parameter 1: the PDSCH signal is transmitted through the first CSI-RS resource among CSI-RS resources included in the measurement set;
2. parameter 2: the PDSCH signal is transmitted through the second CSI-RS resource among the CSI-RS resources included in the measurement set;
3. parameter 3: the PDSCH signal is transmitted through the third CSI-RS resource among the CSI-RS resources included in the measurement set; and
4. parameter 4: the PDSCH signal is not transmitted through the CSI-RS resources included in the measurement set.

That is, if the parameter indicating the relationship between the cell through which the PDSCH signal is transmitted and the CSI-RS is set as one of the parameter 1 to the parameter 3, the UE detects that the PDSCH signal is transmitted through one of the first CSI-RS resource to the third CSI-RS resource among the CSI-RS resources included in the measurement set, and detects the PDSCH signal after estimating a DM-RS channel using channel information acquired from a related CSI-RS. The parameter indicating the relationship between the cell through which the PDSCH signal is transmitted and the CSI-RS is transmitted using a RRC message. The RRC message including the parameter indicating the relationship between the cell through which the PDSCH signal is transmitted and the CSI-RS may be implemented as a new RRC message or an RRC message of the related art. The detailed description for the RRC message including the parameter indicating the relationship between the cell through which the PDSCH signal is transmitted and the CSI-RS will be omitted.

If the parameter indicating the relationship between the cell through which the PDSCH signal is transmitted and the CSI-RS is set as the parameter 4, the UE does not use the channel information acquired from the CSI-RS for estimating the DM-RS channel.

If information indicating a relationship between a cell through which a PDSCH signal is transmitted and a CSI-RS is added to the DM-RS sequence configuration information, the CRS resource position configuration information, and the PDSCH transmission start position (OFDM symbol position) configuration information in Table 8, the UE may detect DM-RS sequence configuration information, a resource available for a PDSCH signal transmission, and information indicating a relationship between DM-RS and a CSI-RS according to an $n_{SCID}$ as expressed in Table 10.

If the $n_{SCID}$ value is set as 0, the UE detects DM-RS sequence configuration information, PDSCH resource configuration information, and DM-RS channel estimation information according to the first DM-RS sequence configuration information, the first CRS resource position configuration information, the first PDCCH resource information, and the first relationship information between the DM-RS and the CSI-RS configured by a RRC message.

If the $n_{SCID}$ value is set as 1, the UE detects DM-RS sequence configuration information, PDSCH resource configuration information, and DM-RS channel estimation information according to the second DM-RS sequence configuration information, the second CRS resource position configuration information, the second PDCCH resource information, and the second relationship information between the DM-RS and the CSI-RS configured by the RRC message. In Table 10, the relationship information between DM-RS and CSI-RS may be changed to relationship information between a PDSCH signal transmission and a CSI-RS.

TABLE 10

| $n_{SCID}$ | DM-RS sequence configuration | CRS resource position configuration | PDSCH transmission start OFDM symbol configuration | relationship information between DM-RS and CSI-RS |
|---|---|---|---|---|
| 0 | $1^{st}$ DM-RS sequence configured by RRC | $1^{st}$ set of [$v_{shift}$ (or PCID), MBSFN configuration, and # of CRS antenna ports] configured by RRC | $1^{st}$ RRC configuration for PDSCH starting OFDM symbol | $1^{st}$ RRC configuration for co-location between CSI-RS and DM-RS(PDSCH) |
| 1 | $2^{nd}$ DM-RS sequence configured by RRC | $2^{nd}$ set of [$v_{shift}$ (or PCID), MBSFN configuration, and # of CRS antenna ports] configured by RRC | $2^{nd}$ RRC configuration for PDSCH starting OFDM symbol | $2^{nd}$ RRC configuration for co-location between CSI-RS and DM-RS(PDSCH) |

If information for a PDCCH resource is added to the DM-RS sequence configuration information, the CRS resource position configuration information, and the PDSCH transmission start position (OFDM symbol position) configuration information in Table 9, the UE may detect DM-RS sequence configuration information, a resource available for a PDSCH signal transmission, and information indicating a relationship between a DM-RS and a CSI-RS using an $n_{SCID}$ and an additional bit as expressed in Table 11.

TABLE 11

| $n_{SCID}$ | additional bit | DM-RS sequence configuration | CRS resource position configuration | PDSCH transmission start OFDM symbol configuration | relationship information between DM-RS and CSI-RS |
|---|---|---|---|---|---|
| 0 | 0 | $1^{st}$ DM-RS sequence configured by RRC | $1^{st}$ set of [$v_{shift}$ (or PCID), MBSFN configuration, and # of CRS antenna ports] configured by RRC | $1^{st}$ RRC configuration for PDSCH starting OFDM symbol | $1^{st}$ RRC configuration for co-location between CSI-RS and DM-RS(PDSCH) |
| 0 | 1 | $1^{st}$ DM-RS sequence configured by RRC | $2^{nd}$ set of [$v_{shift}$ (or PCID), MBSFN configuration, and # of CRS antenna ports] configured by RRC | $2^{nd}$ RRC configuration for PDSCH starting OFDM symbol | $3^{rd}$ RRC configuration for co-location between CSI-RS and DM-RS(PDSCH) |

TABLE 11-continued

| $n_{SCID}$ | additional bit | DM-RS sequence configuration | CRS resource position configuration | PDSCH transmission start OFDM symbol configuration | relationship information between DM-RS and CSI-RS |
|---|---|---|---|---|---|
| 1 | 0 | $2^{nd}$ DM-RS sequence configured by RRC | $3^{rd}$ set of [$v_{shift}$ (or PCID), MBSFN configuration, and # of CRS antenna ports] configured by RRC | $3^{rd}$ RRC configuration for PDSCH starting OFDM symbol | $4^{th}$ RRC configuration for co-location between CSI-RS and DM-RS(PDSCH) |
| 1 | 1 | $2^{nd}$ DM-RS sequence configured by RRC | $4^{th}$ set of [$v_{shift}$ (or PCID), MBSFN configuration, and # of CRS antenna ports] configured by RRC | $4^{th}$ RRC configuration for PDSCH starting OFDM symbol | $2^{nd}$ RRC configuration for co-location between CSI-RS and DM-RS(PDSCH) |

In Table 11, the relationship information between DM-RS and CSI-RS may be changed to relationship information between a PDSCH signal transmission and a CSI-RS. In Table 6 to Table 11, each bit state of a DCI format setting DM-RS sequence configuration information, a resource available for a PDSCH signal transmission, and information indicating a relationship between DM-RS and a CSI-RS is determined corresponding to information configured by a RRC message. However, it will be understood by those of ordinary skill in the art that a specific bit state is fixed to specific information without being configured by the RRC message.

For example, in the last state '11' in Table 11, other information except for the DM-RS sequence configuration information is not configured by the RRC message and is configured as in Table 12. In the present exemplary embodiment, the states except for the state '11' may be set as Table 12. A part of all pieces of information in Table 12 may be carried to the UE using a DCI format. In this case, a column including the information carried using the DCI format may be deleted from Table 12.

Therefore, if the UE detects the PDCCH using the P-RNTI or the SI-RNTI, the UE uses the PDSCH RE mapping for the serving cell. On the other hand, when the UE detects the PDCCH using RNTIs other than the P-RNTI and the SI-RNTI, the UE may use at least one of new PDSCH RE mappings described below in the methods described with respect to Table 13 or Table 14.

Table 13 and Table 14 are described below.

In LTE Release 10, $n_{SCID}$ is switched between 0 and 1 only for the case where the UE is scheduled with PDSCH transmission of 1 layer or 2 layers. If the UE is configured with PDSCH transmission of more than 2 layers, $n_{SCID}$ is fixed to 0. Accordingly, if Table 15 or Table 16 is used, a PDSCH RE mapping cannot be switched between two candidates when the UE is scheduled with a PDSCH transmission of more than 2 layers. Therefore, an additional feature may be adopted to facilitate a PDSCH RE mapping for supporting a Dynamic Point Selection (DPS) scheme and a JT scheme in a PDSCH transmission of more than 2 layers such as in Table 13. Here, the DPS scheme is identical to the DS scheme.

TABLE 12

| $n_{SCID}$ | additional bit | DM-RS sequence configuration | CRS resource position configuration | PDSCH transmission start OFDM symbol configuration | relationship information between DM-RS and CSI-RS |
|---|---|---|---|---|---|
| 1 | 1 | $2^{nd}$ DM-RS sequence configured by RRC | a CRS resource position for a cell which a UE accesses | a start position configuration for a cell which a UE accesses | a PDSCH signal is transmitted at a point at which a CRS is transmitted |

Exemplary Embodiment #9/Exemplary Embodiment #10/Exemplary Embodiment #11

In the LTE mobile communication system, the system information and the paging information are transmitted to all UEs in a cell regardless of UE capability. That is, the system information and the paging information are transmitted to Release 8/9/10 UEs as well as Release 11 UEs.

Therefore, a PDSCH RE mapping for the paging information and the system information should use a PDSCH RE mapping equal to a PDSCH RE mapping for the serving cell. If the UE is scheduled with the system information or the paging information, a PDCCH for the scheduling uses a CRC of an SI-RNTI or a P-RNTI, respectively.

TABLE 13

| The Number of layers | PDSCH RE mapping |
|---|---|
| 1 or 2 | Use Table 15 (or Table 16) |
| More than 2 | PDSCH RE mapping for a JT scheme among all CoMP cells |

In Table 13, a PDSCH RE mapping for the scheduled number of layers is expressed.

For Table 13, if a UE is configured with a PDSCH transmission of 1 or 2 layers, the UE may assume the PDSCH RE mapping in Table 15 (or Table 16) which is dependent on a value of $n_{SCID}$. On the other hand, if the UE is configured with a PDSCH transmission of more than 2 layers, the UE may assume the PDSCH RE mapping for the JT scheme among all CoMP cells. As another alternative to Table 13, an entry in the second row and the second column can be replaced to a PDSCH RE mapping for the JT scheme among a set of cells configured by higher layer signaling such as Table 14. In this case, additional RRC signaling to indicate a PDSCH RE mapping of more than 2 layers should be introduced.

Although, in Table 13 and Table 14, a PDSCH RE mapping is determined by whether the number of layers of a PDSCH transmission is "1 or 2" or "more than 2", the present invention may not be restricted to this case. That is, the switching point of a PDSCH RE mapping can be an arbitrary number of layers. For example, the PDSCH RE mapping can be determined by whether the number of layers of a PDSCH transmission is "1" or "more than 1". The design assumption on this example is that a PDSCH transmission of larger than one layer for CoMP UEs can occur only when the JT scheme is applied.

TABLE 14

| The Number of layers | PDSCH RE mapping |
| --- | --- |
| 1 or 2 | Use Table 15 (or Table 16) |
| More than 2 | PDSCH RE mapping for the JT scheme among a set of cells configured by higher layer signaling |

In Table 14, a PDSCH RE mapping for the scheduled number of layers is expressed.

Table 15 and Table 16 are described below.

An indication of a PDSCH RE mapping is tied to a DM-RS scrambling indication. The reason for the joint indication between a DM-RS scrambling and a PDSCH RE mapping is that determination of both a DM-RS scrambling and a PDSCH RE mapping is related to which a Transmission Point (TP) is used for the PDSCH transmission.

For one example, the indication of the PDSCH RE mapping can be tied to Table 17 or Table 18 such as Table 15 or Table 16, respectively, where $C_i$ represents a cell and RE_mapping($C_1, C_2, \ldots, C_K$) denotes the PDSCH RE mapping for the JT scheme among cells $C_1, C_2, \ldots, C_K$ with $K \geq 1$. If K=1, RE_mapping($C_1$) denotes the PDSCH RE mapping for the cells $C_1$.

Figure 16:
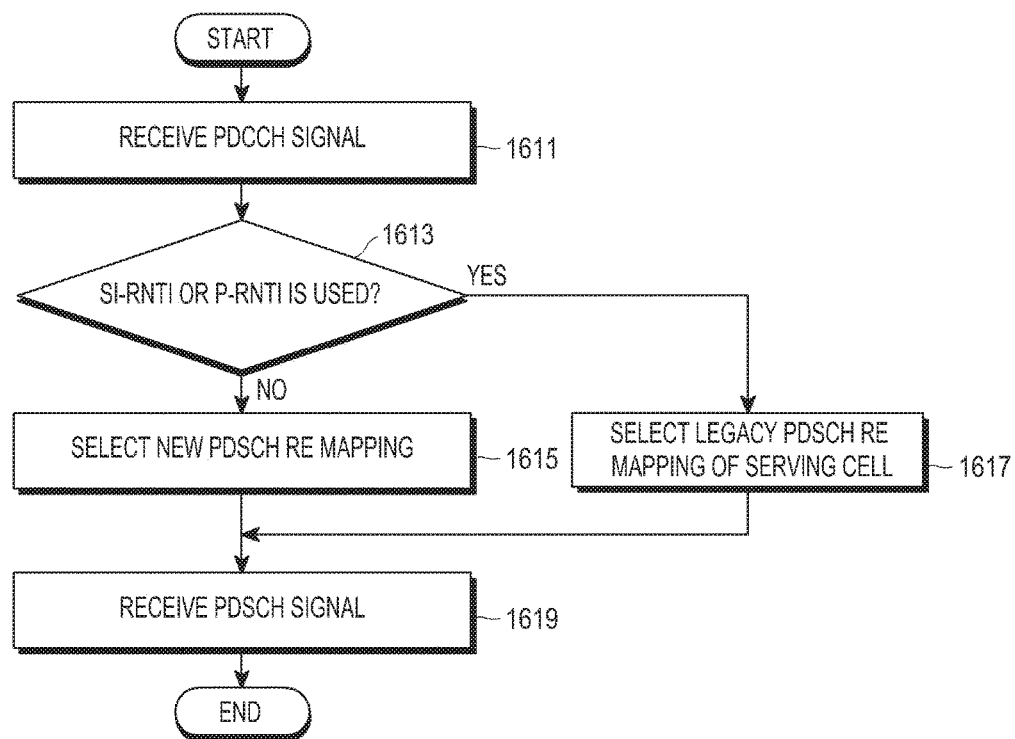
FIG. 16 is a flowchart illustrating a method for receiving a PDSCH signal in a UE in a cellular radio communication system using a CoMP scheme according to an exemplary embodiment #9 of the present invention.
Figure 17:
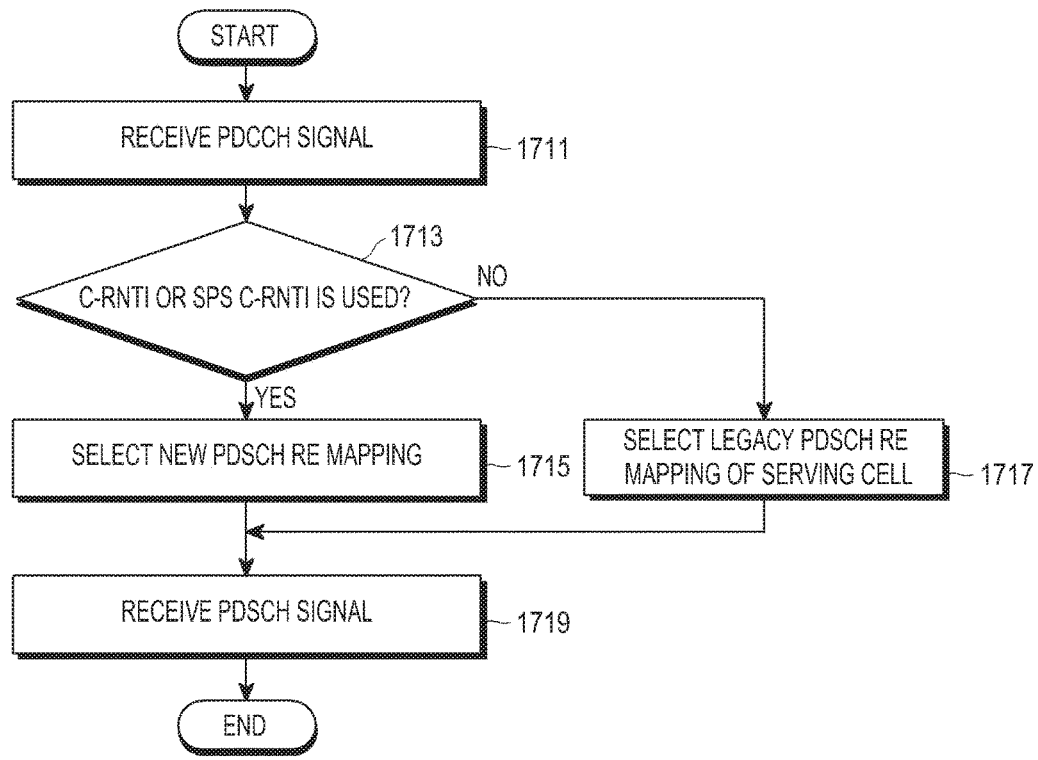
FIG. 17 is a flowchart illustrating a method for receiving a PDSCH signal in a UE in a cellular radio communication system using a CoMP scheme according to an exemplary embodiment #10 of the present invention.

There are two ways for a UE to decode a PDSCH signal under an assumption of the PDSCH RE mapping for the JT scheme among multiple cells. The first way is a rate-matching method where UEs decode the PDSCH signal under an assumption that an eNB maps data bits to REs in order of skipping CRS positions for multiple cells for the JT scheme as shown in FIG. 16. On the other hand, the second way is a puncturing method where the UEs decode the PDSCH signal under an assumption that the eNB maps the data bits to the REs in order of the serving cell but punctures the CRS positions for the multiple cells for the JT scheme as shown in FIG. 17.

Note that in order for the UE to determine a PDSCH RE mapping for a cell $C_i$, the eNB should signal at least one of the following parameters to the UE:
 a. Physical Cell-ID of $C_i$ (or Cell-ID mod 6);
 b. MBSFN SCI of $C_i$;
 c. Number of CRS port of $C_i$;
 d. Sub-frame offset value of $C_i$ from reference (serving/primary) cell; and
 e. Number of OFDM symbols to assume for control region.

That is, if Table 15 is used, after two sets of (D1, X1, RE_mapping($C_1, C_2, \ldots, C_K$)) and (D2, X2, RE mapping ($C_{K+1}, C_{K+2}, \ldots, C_{K+L}$)) are configured for the UE by higher layer signaling, the UE may use $n_{SCID}$ derived in DCI to determine one of the two sets in one sub-frame scheduled for a PDSCH transmission.

On the other hand, if Table 16 is used, after two pairs of (X1, RE_mapping($C_1, C_2, \ldots, C_K$)) and (X2, RE_mapping ($CK_{K+1}, C_{K+2}, \ldots, C_{K+L}$)) are configured for the UE by higher layer signaling, the UE may use $n_{SCID}$ derived in DCI to determine one of the two pairs in one sub-frame scheduled for a PDSCH transmission.

As an alternative scheme, the last columns in Table 8 and 9 can include a fixed PDSCH RE mapping method without RRC signaling for the last columns such that "$n_{SCID}=0$" indicates a PDSCH RE mapping for the serving cell and "$n_{SCID}=1$" indicates a PDSCH RE mapping for a neighbor cell, or vice versa.

TABLE 15

| $n_{SCID}$ | $\Delta_{n_{SCID}}$ | $X_{n_{SCID}}$ | PDSCH RE mapping |
| --- | --- | --- | --- |
| 0 | D1 | X1 | RE_mapping($C_1, C_2, \ldots, C_K$) |
| 1 | D2 | X2 | RE_mapping($C_{K+1}, C_{K+2}, \ldots, C_{K+L}$) |

In Table 15, $X_{n_{SCID}}$, $\Delta n_{SCID}$, and a PDSCH RE mapping for $n_{SCID}$, ($K \geq 1, L \geq 1$) are expressed.

TABLE 16

| $n_{SCID}$ | $X_{n_{SCID}}$ | PDSCH RE mapping |
| --- | --- | --- |
| 0 | X1 | RE_mapping($C_1, C_2, \ldots, C_K$) |
| 1 | X2 | RE_mapping($C_{K+1}, C_{K+2}, \ldots, C_{K+L}$) |

In Table 16, $X_{n_{SCID}}$ and a PDSCH RE mapping for $n_{SCID}$, ($K \geq 1, L \geq 1$) are expressed.

Table 17 and Table 18 are described below.

In one alternative to realize a dynamic adaptation of the DM-RS scrambling sequence, the following initialization value of the DM-RS random sequence is used for a UE:

$$c_{init} = (\lfloor n_{s,n_{SCID}}/2 \rfloor + 1) \cdot (2 X_{n_{SCID}} + 1) \cdot 2^{16} + n_{SCID} \quad \text{Equation (2)}$$

where $n_{SCID}$) is dynamically determined by DCI between 0 and 1 such as LTE Release 10. Another parameter $n_{s,n_{SCID}}$ in Equation (2) is given by $n_{s,n_{SCID}} = n_s + 2\Delta_{n_{SCID}}$ mod 20 where $n_s$ is the slot number of the serving (or primary) cell of the UE and $\Delta_{n_{SCID}}$ is a sub-frame offset value depending on $n_{SCID}$ in a range of size 10 such as [0, 9] or [−4, 5].

One way to determine the parameters $n_{s,n_{SCID}}$ and $X_{n_{SCID}}$ is to use Table 17 where D1, X1, D2, and X2 are signaled by a higher layer. That is, after two pairs of (D1, X1) and (D2, X2) are configured for a UE by higher layer signaling, the UE may use $n_{SCID}$ derived in DCI to determine one of the two pairs in one sub-frame scheduled for a PDSCH transmission.

TABLE 17

| $n_{SCID}$ | $\Delta_{n_{SCID}}$ | $X_{n_{SCID}}$ |
| --- | --- | --- |
| 0 | D1 | X1 |
| 1 | D2 | X2 |

In Table 17, $X_{n_{SCID}}$ and $\Delta_{n_{SCID}}$ for $n_{SCID}$ are expressed.

In another way to determine parameters $n_{s,n_{SCID}}$ and $X_{n_{SCID}}$, $X_{n_{SCID}}$ is determined by Table 18 where X1 and X2 are signaled by the higher layer and $n_{s,n_{SCID}}$ is determined as follows:

a. If $X_{n_{SCID}} = N_{ID}^{Cell-i}$, the UE uses a slot number of Cell-i; and
b. If $x_{n_{SCID}} \neq N_{ID}^{Cell-i}$ for all i, the slot number is set to a default value (e.g. $n_{s,n_{SCID}} = 0$). where, $N_{ID}^{Cell-1}$, $N_{ID}^{Cell-2}$, ..., $N_{ID}^{Cell-M}$ are Cell-IDs of cells Cell-1, Cell-2, ..., Cell-M for which the UE reported Reference Signal Received Power (RSRP) at least once, or Cell-IDs in a list of physical Cell-IDs which is signaled by an eNB.

TABLE 18

| $n_{SCID}$ | $X_{n_{SCID}}$ |
|---|---|
| 0 | X1 |
| 1 | X2 |

In Table 18, $X_{n_{SCID}}$ for $n_{SCID}$ is expressed.

FIG. 16 is a flowchart illustrating a method for receiving a PDSCH signal in a UE in a cellular radio communication system using a CoMP scheme according to an exemplary embodiment #9 of the present invention.

Referring to FIG. 16, a UE receives a PDCCH signal for a PDSCH scheduling in step 1611. The UE determines whether an SI-RNTI or a P-RNTI has been used for the PDCCH signal in step 1613. If the SI-RNTI and the P-RNTI have not been used for the PDCCH signal, the UE selects a new PDSCH RE mapping in which Table 13 or Table 14 is used in step 1615.

If the SI-RNTI or the P-RNTI has been used for the PDCCH signal, the UE selects a legacy PDSCH RE mapping for a serving cell in step 1617.

The UE receives a PDSCH signal based on the selected PDSCH RE mapping in step 1619.

In a CoMP transmission mode (corresponding to a transmission mode 9 in LTE Release 10), UEs can be scheduled by one of the following combinations of DCI format and RNTI in PDCCH (or evolved PDCCH (ePDCCH)):
  a. DCI format 2C and C-RNTI;
  b. DCI format 2C and SPS C-RNTI;
  c. DCI format 1A and C-RNTI;
  d. DCI format 1A and SPS C-RNTI;
  e. DCI format 1A and P-RNTI;
  f. DCI format 1A and SI-RNTI;
  g. DCI format 1A and RA-RNTI;
  h. DCI format 1C and P-RNTI;
  i. DCI format 1C and SI-RNTI; and
  j. DCI format 1C and RA-RNTI.

Here, the C-RNTI is a cell RNTI, the SPS-C-RNTI is a Semi-Persistent Scheduling C-RNTI, and the RA-RNTI is a Random Access RNTI.

For the above combinations, the DCI format 2C is used for PDSCH scheduling with up to 8-layer transmission based on a DM-RS and includes indication fields to realize possible dynamic CoMP operations. The DCI format 1A is used for compact PDSCH scheduling with a small indication field.

The DCI format 1C is used for very compact PDSCH scheduling and dedicated to scheduling for paging information and system information, or a random access procedure. Additionally, the C-RNTI is used for data scheduling and the SPS C-RNTI is used for semi-persistent scheduling of data. The P-RNTI, SI-RNTI, and RA-RNTI are for scheduling of the paging information and the system information, and random access messages, respectively.

For a UE, data is dedicated to the UE such that the data can be transmitted by using a DPS scheme or a JT scheme, while the paging information and the system information are broadcast information to multiple UEs including Release 8/9/10 UEs as well as Release 11 UEs.

The Random access messages are used for various cases including loss of SYNC for the UE. Based on the discussion on the use of DCI formats and RNTIs, UE assumption on a PDSCH RE mapping for each combination of DCI format and RNTI in the CoMP transmission mode can be defined as Table 19.

TABLE 19

| Combination of DCI format and RNTI | PDSCH RE mapping |
|---|---|
| DCI format 2C and C-RNTI | New RE mapping for CoMP |
| DCI format 2C and SPS C-RNTI | New RE mapping for CoMP |
| DCI format 1A and C-RNTI | New RE mapping for CoMP |
| DCI format 1A and SPS C-RNTI | New RE mapping for CoMP |
| DCI format 1A and P-RNTI | Legacy RE mapping for the serving cell |
| DCI format 1A and SI-RNTI | Legacy RE mapping for the serving cell |
| DCI format 1A and RA-RNTI | Legacy RE mapping for the serving cell |
| DCI format 1C and P-RNTI | Legacy RE mapping for the serving cell |
| DCI format 1C and SI-RNTI | Legacy RE mapping for the serving cell |
| DCI format 1C and RA-RNTI | Legacy RE mapping for the serving cell |

In Table 19, New RE mapping for CoMP means at least one of the above mentioned PDSCH RE mapping alternatives for CoMP. Legacy RE mapping for the serving cell denotes a PDSCH RE mapping method for each case defined in an LTE Release 10 specification.

If UE assumption on a PDSCH RE mapping in Table 19 is used, switching between the new RE mapping and the legacy RE mapping can be based on a RNTI. That is, if the C-RNTI or the SPS RNTI is used for scheduling of a CoMP UE, the new PDSCH RE mapping applies, while the legacy PDSCH RE mapping is used if the P-RNTI, the SI-RNTI or the RA-RNTI is used for the scheduling.

FIG. 17 is a flowchart illustrating a method for receiving a PDSCH signal in a UE in a cellular radio communication system using a CoMP scheme according to an exemplary embodiment #10 of the present invention.

Referring to FIG. 17, a UE receives a PDCCH signal for a PDSCH scheduling in step 1711. The UE determines whether a C-RNTI or an SPS C-RNTI has been used for the PDCCH signal in step 1713. If the C-RNTI or the SPS C-RNTI has been used for the PDCCH signal, the UE selects a new PDSCH RE mapping in which Table 19 is used in step 1715.

If the C-RNTI and the SPS C-RNTI have not been used for the PDCCH signal, the UE selects a legacy PDSCH RE mapping for a serving cell in step 1717.

The UE receives a PDSCH signal based on the selected PDSCH RE mapping in step 1719.

In FIG. 17, note that the UE can decide a PDSCH RE mapping assumption of the UE between a new RE mapping and a legacy RE mapping after the UE detects both of the DCI format and the RNTI. The decision may be based on Table 19.

Since DCI format 1A includes a small indication field, the DCI format 1A could not be appropriate to CoMP scheduling. For this reason, data transmission of scheduling by the DCI format 1A might not go with a DPS scheme or a JT scheme. Based on this situation for the DCI format 1A, UE assumption on PDSCH RE mapping for each combination of the DCI format and the RNTI in the CoMP transmission mode can be defined as Table 20.

TABLE 20

| Combination of DCI format and RNTI | PDSCH RE mapping |
| --- | --- |
| DCI format 2C and C-RNTI | New RE mapping for CoMP |
| DCI format 2C and SPS C-RNTI | New RE mapping for CoMP |
| DCI format 1A and C-RNTI | Legacy RE mapping for the serving cell |
| DCI format 1A and SPS C-RNTI | Legacy RE mapping for the serving cell |
| DCI format 1A and P-RNTI | Legacy RE mapping for the serving cell |
| DCI format 1A and SI-RNTI | Legacy RE mapping for the serving cell |
| DCI format 1A and RA-RNTI | Legacy RE mapping for the serving cell |
| DCI format 1C and P-RNTI | Legacy RE mapping for the serving cell |
| DCI format 1C and SI-RNTI | Legacy RE mapping for the serving cell |
| DCI format 1C and RA-RNTI | Legacy RE mapping for the serving cell |

In Table 20, a UE assumption on a PDSCH RE mapping is expressed.

If UE assumption on PDSCH RE mapping in Table 20 is used, switching between a new RE mapping and a legacy RE mapping can be based on a DCI format. That is, if the DCI format 2C is used for scheduling of a CoMP UE, the new PDSCH RE mapping applies, while the legacy PDSCH RE mapping is used if the DCI format 1A or the DCI format 1C is used for the scheduling.

Figure 18:
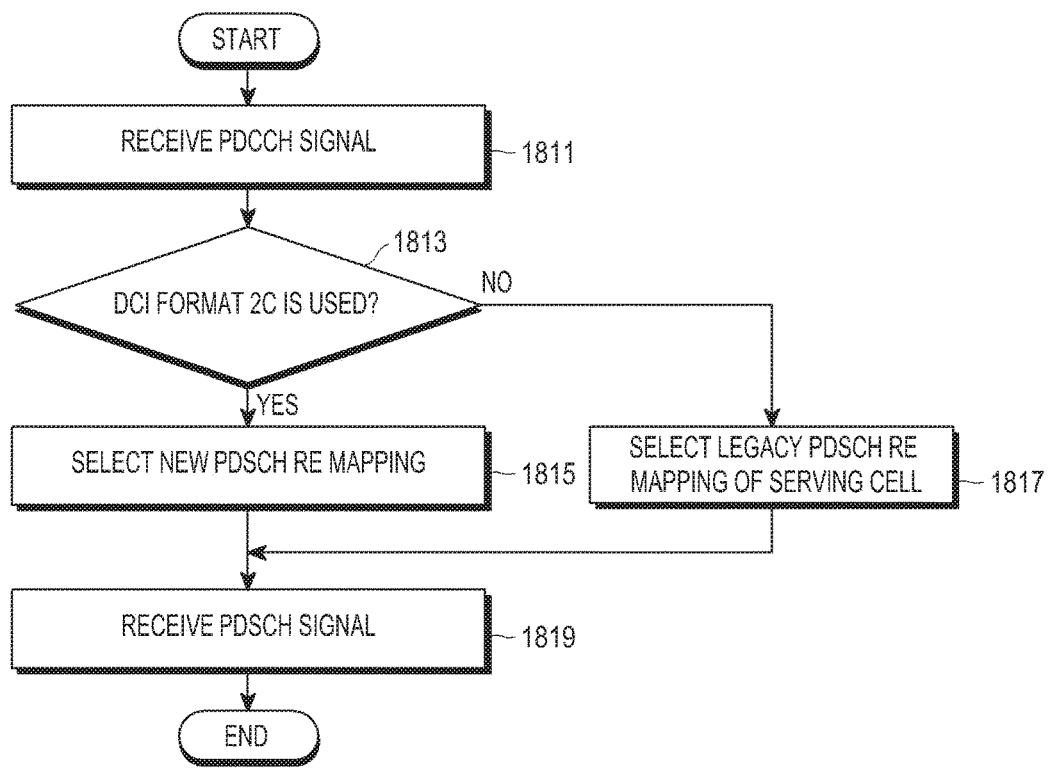
FIG. 18 is a flowchart illustrating a method for receiving a PDSCH signal in a UE in a cellular radio communication system using a CoMP scheme according to an exemplary embodiment #11 of the present invention.

FIG. 18 is a flowchart illustrating a method for receiving a PDSCH signal in a UE in a cellular radio communication system using a CoMP scheme according to an exemplary embodiment #11 of the present invention.

Referring to FIG. 18, a UE receives a PDCCH signal for a PDSCH scheduling in step 1811. The UE determines whether a DCI format 2C has been used for the PDCCH signal in step 1813. If the DCI format 2C has been used for the PDCCH signal, the UE selects a new PDSCH RE mapping in which Table 20 is used in step 1815.

If the DCI format 2C has not been used for the PDCCH signal, the UE selects a legacy PDSCH RE mapping for a serving cell in step 1817.

The UE receives a PDSCH signal based on the selected PDSCH RE mapping in step 1819. In FIG. 18, the UE detects whether the DCI format 2C has not been used for the PDCCH signal, and selects a PDSCH RE mapping used for the PDSCH signal reception according to the detecting result. However, it will be understood by those of ordinary skill in the art that the UE selects the legacy PDSCH RE mapping for the serving cell if the DCI format 2C has been used for the PDCCH signal, and the UE selects the new PDSCH RE mapping if one of various DCI formats such as a DCI format 1A, a DCI format 1C, etc. has been used for the PDCCH signal.

In FIG. 18, note that the UE can decide a PDSCH RE mapping assumption of the UE between a new RE mapping and a legacy RE mapping after the UE detects both of the DCI format and the RNTI. The decision may be based on Table 20.

For another example, the indication of the PDSCH RE mapping can be tied to Table 23 or Table 24 such as Table 21 or Table 22, respectively, where $C_i$ represents a cell and RE_mapping($C_1, C_2, \ldots, C_K$) denotes the PDSCH RE mapping for the JT scheme among cells $C_1, C_2, \ldots, C_K$ with K≥1. If K=1, RE_mapping($C_1$) denotes the PDSCH RE mapping for the cells $C_1$. Note that in order for the UE to determine the PDSCH RE mapping for a cell $C_i$, an eNB should signal at least one of the following parameters to the UE:

a. Physical Cell-ID of $C_i$ (or Cell-ID mod 6);
b. MBSFN sub-frame configuration of $C_i$;
c. Number of CRS port of $C_i$;
d. Sub-frame offset value of $C_i$ from the reference (serving/primary) cell; and
e. Number of OFDM symbols to assume for control region.

That is, if Table 21 is used, after two sets of (D1, X1, RE_mapping($C_1, C_2, \ldots, C_K$)) and (D2, X2, RE_mapping ($C_{K+1}, C_{K+2}, \ldots, C_{K+L}$)) are configured for the UE by higher layer signaling, the UE may use $n_{SCID2}$ derived in DCI to determine one of the two sets in one sub-frame scheduled for PDSCH transmission.

On the other hand, if Table 22 is used, after two pairs of (X1, RE_mapping ($C_1, C_2, \ldots, C_K$)) and (X2, RE_mapping ($C_{K+1}, C_{K+2}, \ldots, C_{K+L}$)) are configured for the UE by higher layer signaling, the UE may use $n_{SCID2}$ derived in DCI to determine one of the two pairs in one sub-frame scheduled for PDSCH transmission.

TABLE 21

| $n_{SCID2}$ | $\Delta_{n_{SCID2}}$ | $X_{n_{SCID2}}$ | PDSCH RE mapping |
| --- | --- | --- | --- |
| 0 | D1 | X1 | RE_mapping($C_1, C_2, \ldots, C_K$) |
| 1 | D2 | X2 | RE_mapping($C_{K+1}, C_{K+2}, \ldots, C_{K+L}$) |

In Table 21, $X_{n_{SCID2}}$, $\Delta_{n_{SCID1}}$, and a PDSCH RE mapping for $n_{SCID2}$, (K≥1, L≥1) are expressed.

TABLE 22

| $n_{SCID2}$ | $X_{n_{SCID2}}$ | PDSCH RE mapping |
| --- | --- | --- |
| 0 | X1 | RE_mapping($C_1, C_2, \ldots, C_K$) |
| 1 | X2 | RE_mapping($C_{K+1}, C_{K+2}, \ldots, C_{K+L}$) |

In Table 22, $X_{n_{SCID2}}$ and a PDSCH RE mapping for $n_{SCID2}$ (K≥1, L≥1) are expressed.

Table 23 and Table 24 are described below.

In another alternative to realize a dynamic adaptation of the DM-RS scrambling sequence, the following initialization value of the DM-RS random sequence is used for a UE:

$$c_{init} = (\lfloor n_{s,n_{SCID2}}/2 \rfloor + 1) \cdot (2X_{n_{SCID2}} + 1) \cdot 2^{16} + n_{SCID} \quad \text{Equation (3)}$$

where $n_{SCID}$ is dynamically determined by DCI for PDSCH scheduling between 0 and 1 like as Release 10 and $n_{SCID2}$ is an additional dynamic parameter determined by DCI for PDSCH scheduling among integers in a range of [0, N−1].

Further, $n_{SCID}$ and $n_{SCID2}$ can be derived in different two DCI fields or one DCI field jointly coded in a DCI format for PDSCH scheduling. If $n_{SCID}$ and $n_{SCID2}$ have different fields, $n_{SCID}$ would be derived from a legacy 3-bit field indicating antenna port(s), scrambling identity, and number of layers, and $n_{SCID2}$ would be derived from a one bit field or a two bits field with N=2 or N=4, respectively. On the other hand, id $n_{SCID}$ and $n_{SCID2}$ are jointly coded in one DCI field, would be if $n_{SCID}$ and $n_{SCID2}$ would be derived from 3, 4 or 5-bit field indicating antenna port(s), scrambling identity ($n_{SCID}$), $n_{SCID2}$, and number of layers.

Another parameter $n_{s,n_{SCID2}}$ in Equation (3) is given by $n_{s,n_{SCID2}} = n_s + 2\Delta_{n_{SCID2}} \mod 20$ where $n_s$ is the slot number of the serving (or primary) cell of the UE and $\Delta_{n_{SCID2}}$ is the sub-frame offset value depending on $n_{SCID1}$ in a range of size 10 such as [0, 9] or [−4, 5]. One way to determine the parameters $n_{s,n_{SCID2}}$ and $X_{n_{SCID2}}$ is to use Table 23 where D1, X1, D2, and X2 are signaled by a higher layer.

The assumption in Table 23 is that $n_{SCID2}$ is determined between 0 and 1. That is, after two pairs of (D1, X1) and (D2, X2) are configured for the UE by higher layer signaling, the UE may use $n_{SCID2}$ derived in DCI to determine one of the two pairs in one sub-frame scheduled for PDSCH transmission.

TABLE 23

| $n_{SCID2}$ | $\Delta_{n_{SCID2}}$ | $X_{n_{SCID2}}$ |
|---|---|---|
| 0 | D1 | X1 |
| 1 | D2 | X2 |

In Table 23, $X_{n_{SCID1}}$ and $\Delta_{n_{SCID2}}$ for $n_{SCID2}$ are expressed.

In another way to determine parameters $n_{s,n_{SCID2}}$ and $X_{n_{SCID2}}$, $X_{n_{SCID2}}$ is determined by Table 24 where X1 and X2 are signaled by higher layer and $n_{s,n_{SCID2}}$ is determined as follows:

a. If $X_{n_{SCID2}} = N_{ID}^{Cell-i}$, the UE uses the slot number of Cell-i; and b. If $X_{n_{SCID2}} \neq N_{ID}^{Cell-i}$ for all i, the slot number is set to a default value (e.g. $n_{s,n_{SCID2}}=0$). where $N_{ID}^{Cell-1}$, $N_{ID}^{Cell-2}$, ..., $N_{ID}^{Cell-M}$ are Cell-IDs of cells Cell-1, Cell-2, ..., Cell-M for which the UE reported a RSRP at least once, or Cell-IDs in a list of physical Cell-IDs which is signaled by an eNB.

TABLE 24

| $n_{SCID2}$ | $X_{n_{SCID2}}$ |
|---|---|
| 0 | X1 |
| 1 | X2 |

In Table 24, $X_{n_{SCID2}}$ for $n_{SCID2}$ is expressed.

For another example, the indication of the PDSCH RE mapping can be tied to Table 27 or Table 28 such as Table 25 or Table 26, respectively, where $C_i$ represents a cell and RE_mapping($C_1, C_2, \ldots, C_K$) denotes the PDSCH RE mapping for the JT scheme among cells $C_1, C_2, \ldots, C_K$ with $K \geq 1$. If K=1, RE_mapping($C_1$) denotes the PDSCH RE mapping for the cells $C_1$. Note that in order for the UE to determine a PDSCH RE mapping for a cell $C_i$, an eNB should signal at least one of the following parameters to the UE:

a. Physical Cell-ID of $C_i$ (or Cell-ID mod 6);

b. MBSFN sub-frame configuration of $C_i$;

c. Number of CRS port of $C_i$;

d. Sub-frame offset value of $C_i$ from the reference (serving/primary) cell; and e. Number of OFDM symbols to assume for control region.

That is, if Table 25 is used, after four sets of (D1, X1, RE_mapping($C_1, C_2, \ldots, C_K$)), (D2, X2, RE_mapping($C_{K+1}, C_{K+2}, \ldots, C_{K+L}$)), (D3, X3, RE_mapping ($C_{K+L+1}, C_{K+L+2}, \ldots, C_{K+L+P}$)), and (D4, X4, RE_mapping ($C_{K+L+P+1}, C_{K+L+P+2}, \ldots, C_{K+L+P+Q}$)) are configured for the UE by higher layer signaling, the UE may use ($n_{SCID}$, $N_{SCID2}$) derived in DCI to determine one of the four sets in one sub-frame scheduled for PDSCH transmission.

On the other hand, if Table 26 is used, after four pairs of (X1, RE_mapping ($C_1, C_2, \ldots, C_K$)), (X2, RE_mapping ($C_{K+1}, C_{K+2}, \ldots, C_{K+L}$)), (X3, RE_mapping ($C_{K+L+1}, C_{K+L+2}, \ldots, C_{K+L+P}$)), and (X4, RE_mapping ($C_{K+L+P+1}, C_{K+L+P+2}, \ldots, C_{K+L+P+Q}$)) are configured for the UE by higher layer signaling, the UE may use ($n_{SCID}, n_{SCID2}$) derived in DCI to determine one of the four pairs in one sub-frame scheduled for PDSCH transmission.

TABLE 25

| ($n_{SCID}$, $n_{SCID2}$) | $\Delta_{(n_{SCID}, nSCID2)}$ | $X_{(n_{SCID}, nSCID2)}$ | PDSCH RE mapping |
|---|---|---|---|
| (0, 0) | D1 | X1 | RE_mapping($C_1, C_2, \ldots, C_K$) |
| (0, 1) | D2 | X2 | RE_mapping($C_{K+1}, C_{K+2}, \ldots, C_{K+L}$) |
| (1, 0) | D3 | X3 | RE_mapping($C_{K+L+1}, C_{K+L+2}, \ldots, C_{K+L+P}$) |
| (1, 1) | D4 | X4 | RE_mapping($C_{K+L+P+1}, C_{K+L+P+2}, \ldots, C_{K+L+P+Q}$) |

In Table 25, $X_{(n_{SCID}, n_{SCID2})}$, $\Delta_{(n_{SCID}, n_{SCID2})}$, and a PDSCH RE mapping for ($n_{SCID}, n_{SCID2}$) ($K \geq 1, L \geq 1, P \geq 1, Q \geq 1$) are expressed.

TABLE 26

| ($n_{SCID}$, $n_{SCID2}$) | $X_{(n_{SCID}, nSCID2)}$ | PDSCH RE mapping |
|---|---|---|
| (0, 0) | X1 | RE_mapping($C_1, C_2, \ldots, C_K$) |
| (0, 1) | X2 | RE_mapping($C_{K+1}, C_{K+2}, \ldots, C_{K+L}$) |
| (1, 0) | X3 | RE_mapping($C_{K+L+1}, C_{K+L+2}, \ldots, C_{K+L+P}$) |
| (1, 1) | X4 | RE_mapping($C_{K+L+P+1}, C_{K+L+P+2}, \ldots, C_{K+L+P+Q}$) |

In Table 26, $X_{(n_{SCID}, n_{SCID2})}$ and a PDSCH RE mapping for ($n_{SCID}, n_{SCID2}$), ($K \geq 1, L \geq 1, P \geq 1, Q \geq 1$) are expressed.

Table 27 and Table 28 are described below.

In another alternative to realize a dynamic adaptation of the DM-RS scrambling sequence, the following initialization value of the DM-RS random sequence is used for a UE:

$$c_{init} = (\lfloor n_{s,(nSCID,nSCID2)}/2 \rfloor + 1) \cdot (2X_{(nSCID,nSCID2)} + 1) \cdot 2^{16} + n_{SCID} \quad \text{Equation (4)}$$

where $n_{SCID}$ is dynamically determined by DCI for PDSCH scheduling between 0 and 1 such as in Release 10 and $n_{SCID2}$ is an additional dynamic parameter determined by DCI for the PDSCH scheduling among integers in a range of [0, N−1]. Further, $n_{SCID}$ and $n_{SCID2}$ can be derived in different two DCI fields or one DCI field jointly coded in a DCI format for PDSCH scheduling.

If $n_{SCID}$ and $n_{SCID2}$ have different fields, $n_{SCID}$ would be derived from a legacy 3-bit field indicating antenna port(s), scrambling identity, and number of layers, and $n_{SCID2}$ would be derived from a one bit field or a two bits field with N=2 or N=4, respectively. On the other hand, if $n_{SCID}$ and $n_{SCID2}$ are jointly coded in one DCI field, $n_{SCID}$ and $n_{SCID2}$ would be derived from 3, 4 or 5-bit field indicating antenna port(s), scrambling identity ($n_{SCID}$), $n_{SCID2}$, and number of layers.

Another parameter $n_{s,(n_{SCID},n_{SCID2})}$ in Equation (4) is given by $n_{s,(n_{SCID},n_{SCID2})} = n_s + 2\Delta_{(n_{SCID},n_{SCID2})}$ mod 20 where $n_s$ is the slot number of the serving (or primary) cell of the UE and $\Delta_{(n_{SCID},n_{SCID2})}$ is the sub-frame offset value depending on the pair of ($n_{SCID},n_{SCID2}$) in the range of size 10 such as [0, 9] or [−4, 5]. One way to determine the parameters $n_{s,(n_{SCID},n_{SCID2})}$ and $X_{(n_{SCID},n_{SCID2})}$ is to use Table 27 where D1, D2, D3, D4, X1, X2, X3, and X4 are signaled by higher layer.

The assumption in Table 27 is that $n_{SCID2}$ is determined between 0 and 1. That is, after four pairs of (D1, X1), (D2, X2), (D3, X3) and (D4, X4) are configured for a UE by higher layer signaling, the UE will use ($n_{SCID},n_{SCID2}$) derived in DCI to determine one of the four pairs in one sub-frame scheduled for PDSCH transmission.

TABLE 27

| ($n_{SCID}$, $n_{SCID2}$) | $\Delta_{(nSCID, nSCID2)}$ | $X_{(nSCID, nSCID2)}$ |
|---|---|---|
| (0, 0) | D1 | X1 |
| (0, 1) | D2 | X2 |
| (1, 0) | D3 | X3 |
| (1, 1) | D4 | X4 |

In Table 27, $X_{(n_{SCID},n_{SCID2})}$ and $\Delta_{(n_{SCID},n_{SCID2})}$ for ($n_{SCID},n_{SCID2}$) are expressed.

In another way to determine parameters $n_{s,(n_{SCID},n_{SCID2})}$ and $X_{(n_{SCID},n_{SCID2})}$, $X_{(n_{SCID},n_{SCID2})}$ is determined by Table 28 where X1, X2, S3, and S4 are signaled by a higher layer and $n_{s,(n_{SCID},n_{SCID2})}$ is determined as follows:

a. If $X_{(n_{SCID},n_{SCID2})} = N_{ID}^{Cell-i}$, the UE uses the slot number of Cell-i; and
b. If $X_{(n_{SCID},n_{SCID2})} \neq N_{ID}^{Cell-i}$ for all i, the slot number is set to a default value (e.g., $n_{s,(n_{SCID},n_{SCID2})} = 0$).

where $N_{ID}^{Cell-1}, N_{ID}^{Cell-2}, \ldots, N_{ID}^{Cell-M}$ are Cell-IDs of cells Cell-1, Cell-2, . . . , Cell-M for which the UE reported a RSRP at least once, or Cell-IDs in a list of physical Cell-IDs which is signaled by an eNB.

TABLE 28

| ($n_{SCID}$, $n_{SCID2}$) | $X_{(nSCID, nSCID2)}$ |
|---|---|
| (0, 0) | X1 |
| (0, 1) | X2 |
| (1, 0) | X3 |
| (1, 1) | X4 |

In Table 28, $X_{(n_{SCID},n_{SCID2})}$ for ($n_{SCID},n_{SCID2}$) is expressed.

Figure 19:
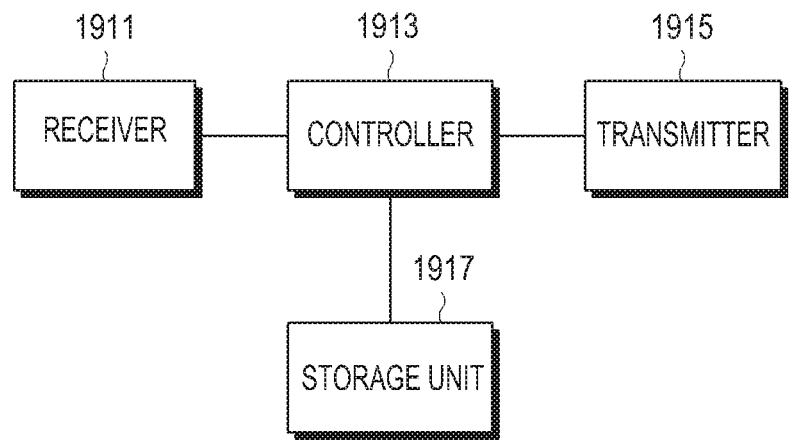
FIG. 19 schematically illustrates an internal structure of a UE in a cellular radio communication system using a CoMP scheme according to an exemplary embodiment of the present invention.

FIG. 19 schematically illustrates an internal structure of a UE in a cellular radio communication system using a CoMP scheme according to an exemplary embodiment of the present invention.

Referring to FIG. 19, a UE includes a receiver 1911, a controller 1913, a transmitter 1915, and a storage unit 1917.

The controller 1913 controls the overall operation of the UE. In particular, the controller 1913 controls the UE to perform an operation of receiving a PDSCH signal according to an exemplary embodiment #1 to an exemplary embodiment #11 of the present invention. The operation of receiving the PDSCH signal is performed in the manner described before with reference to FIGS. 4 to 18, so a detailed description thereof will be omitted herein.

The receiver 1911 receives signals from a CCA, a BS, etc. under the control of the controller 1913. The signals received in the receiver 1911 are described before with reference to FIGS. 4 to 18, so a detailed description thereof will be omitted herein.

The transmitter 1915 transmits signals to the CCA, the BS, etc. under the control of the controller 1913. The signals transmitted in the transmitter 1915 are described before with reference to FIGS. 4 to 18, so a detailed description thereof will be omitted herein.

The storage unit 1917 stores the signals received by the receiver 1911 and data for the operation of the UE, e.g., information related to the operation of receiving the PDSCH signal.

While the receiver 1911, the controller 1913, the transmitter 1915, and the storage unit 1917 are shown in FIG. 19 as separate units, it is to be understood that this is for merely convenience of description. In other words, two or more of the receiver 1911, the controller 1913, the transmitter 1915, and the storage unit 1917 may be incorporated into a single unit.

Figure 20:
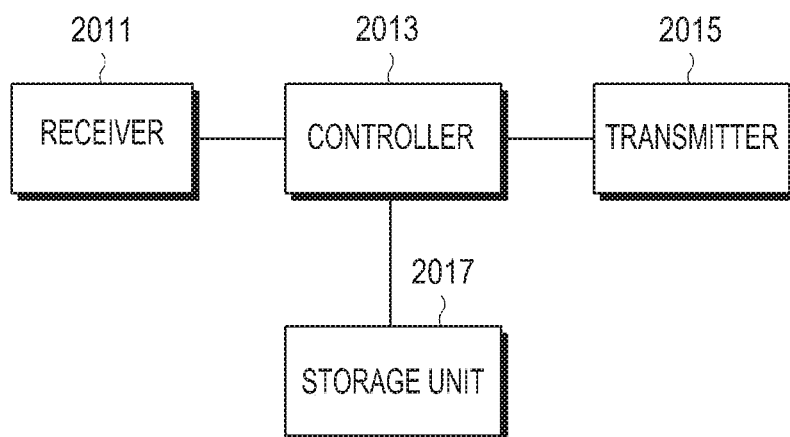
FIG. 20 schematically illustrates an internal structure of a Central Control Apparatus (CCA) in a cellular radio communication system using a CoMP scheme according to an exemplary embodiment of the present invention.

FIG. 20 schematically illustrates an internal structure of a CCA in a cellular radio communication system using a CoMP scheme according to an exemplary embodiment of the present invention.

Referring to FIG. 20, a CCA includes a receiver 2011, a controller 2013, a transmitter 2015, and a storage unit 2017.

The controller 2013 controls the overall operation of the CCA. In particular, the controller 2013 controls the CCA to perform an operation related to a PDSCH signal reception operation in a UE according to an exemplary embodiment #1 to an exemplary embodiment #11 of the present invention. The operation related to the PDSCH signal reception operation in the UE is performed in the manner described before with reference to FIGS. 4 to 18, so a detailed description thereof will be omitted herein.

The receiver 2011 receives signals from the UE, a BS, etc. under a control of the controller 2013. The signals received in the receiver 2011 are described before with reference to FIGS. 4 to 18, so a detailed description thereof will be omitted herein.

The transmitter 2015 transmits signals to the CCA, the BS, etc. under a control of the controller 2013. The signals transmitted in the transmitter 2015 are described before with reference to FIGS. 4 to 18, so a detailed description thereof will be omitted herein.

The storage unit 2017 stores the signals received by the receiver 2011 and data for an operation of the CCA, e.g., information related to the PDSCH signal reception operation in the UE.

While the receiver 2011, the controller 2013, the transmitter 2015, and the storage unit 2017 are shown in FIG. 20 as separate units, it is to be understood that this is for merely convenience of description. In other words, two or more of the receiver 2011, the controller 2013, the transmitter 2015, and the storage unit 2017 may be incorporated into a single unit.

As is apparent from the foregoing description, exemplary embodiments of the present invention enable a downlink data channel signal transmission information transmission/reception in a cellular radio communication system using a CoMP scheme. Exemplary embodiments of the present invention enable a downlink data channel signal transmission information transmission/reception in a cellular radio communication system using a CoMP scheme, thereby a signal reception apparatus receives a downlink data channel signal by considering a resource through which a CRS is transmitted. Exemplary embodiments of the present invention enable a downlink data channel signal transmission information transmission/reception in a cellular radio communication system using a CoMP scheme, thereby a signal reception apparatus receives a downlink data channel signal by considering a resource through which a CSI-RS is transmitted. Exemplary embodiments of the present invention enable a downlink data channel signal transmission information transmission/reception in a cellular radio communication system using a CoMP scheme, thereby a signal reception apparatus receives a downlink data channel signal by considering a system information transmission. Exemplary embodiments of the present invention enable a downlink data channel signal transmission information transmission/reception in a cellular radio communication system using a CoMP scheme, thereby a signal reception apparatus receives a downlink data channel signal by considering a resource through which a SYNC signal is transmitted. Exemplary embodiments of the present invention enable a downlink data channel signal transmission information transmission/reception in a cellular radio communication system using a CoMP scheme, thereby a signal reception apparatus receives a downlink data channel signal by considering a resource through which a PBCH signal is transmitted. Exemplary embodiments of the present invention enable a downlink data channel signal transmission information transmission/reception in a cellular radio communication system using a CoMP scheme, thereby a signal reception apparatus receives a downlink data channel signal by considering a resource through which a DM-RS is transmitted. Exemplary embodiments of the present invention enable a downlink data channel signal transmission information transmission/reception in a cellular radio communication system using a CoMP scheme, thereby a signal reception apparatus receives a downlink data channel signal by considering at least one of a SI-RNTI, a P-RNTI, a C-RNTI, an SPS-C-RNTI, and a RA-RNTI. Exemplary embodiments of the present invention enable a downlink data channel signal transmission information transmission/ reception in a cellular radio communication system using a CoMP scheme, thereby a signal reception apparatus receives a downlink data channel signal by considering a DCI format. Exemplary embodiments of the present invention enable a downlink data channel signal transmission information transmission/reception in a cellular radio communication system using a CoMP scheme, thereby a signal reception apparatus receives a downlink data channel signal by considering CoMP associated-scheduling information.

Exemplary embodiments of the present invention enable a transmission/reception for downlink data channel signal transmission information on each of downlink data channel signals transmitted by a plurality of signal transmission apparatuses in a cellular radio communication system using a CoMP scheme. Exemplary embodiments of the present invention enable a downlink data channel signal transmission information transmission/reception in a cellular radio communication system, thereby a signal reception apparatus receives each of downlink data channel signals transmitted by a plurality of signal transmission apparatuses by considering a resource through which a CRS is transmitted. Exemplary embodiments of the present invention enable a downlink data channel signal transmission information transmission/reception in a cellular radio communication system, thereby a signal reception apparatus receives each of downlink data channel signals transmitted by a plurality of signal transmission apparatuses by considering a resource through which a CSI-RS is transmitted. Exemplary embodiments of the present invention enable a downlink data channel signal transmission information transmission/reception in a cellular radio communication system, thereby a signal reception apparatus receives each of downlink data channel signals transmitted by a plurality of signal transmission apparatuses by considering a system information transmission. Exemplary embodiments of the present invention enable a downlink data channel signal transmission information transmission/reception in a cellular radio communication system, thereby a signal reception apparatus receives each of downlink data channel signals transmitted by a plurality of signal transmission apparatuses by considering a resource through which a SYNC signal is transmitted. Exemplary embodiments of the present invention enable a downlink data channel signal transmission information transmission/reception in a cellular radio communication system, thereby a signal reception apparatus receives each of downlink data channel signals transmitted by a plurality of signal transmission apparatuses by a plurality of signal transmission apparatuses by considering a resource through which a PBCH signal is transmitted. Exemplary embodiments of the present invention enable a downlink data channel signal transmission information transmission/reception in a cellular radio communication system, thereby a signal reception apparatus receives each of downlink data channel signals transmitted by a plurality of signal transmission apparatuses by a plurality of signal transmission apparatuses by considering a resource through which a DM-RS is transmitted. Exemplary embodiments of the present invention enable a downlink data channel signal transmission information transmission/reception in a cellular radio communication system, thereby a signal reception apparatus receives each of downlink data channel signals transmitted by a plurality of signal transmission apparatuses by a plurality of signal transmission apparatuses by considering at least one of an SI-RNTI, a P-RNTI, a C-RNTI, an SPS-C-RNTI, and a RA-RNTI. Exemplary embodiments of the present invention enable a downlink data channel signal transmission information transmission/reception in a cellular radio communication system, thereby a signal reception apparatus receives each of downlink data channel signals transmitted by a plurality of signal transmission apparatuses by considering a DCI format. Exemplary embodiments of the present invention enable a downlink data channel signal transmission information transmission/reception in a cellular radio communication system, thereby a signal reception apparatus receives each of downlink data channel signals transmitted by a plurality of signal transmission apparatuses by a plurality of signal transmission by considering CoMP associated-scheduling information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for wireless communication, the method comprising:
    receiving, using at least one processor, a signaling message via higher layer signaling, the signaling message comprising first configuration information related to a plurality of starting symbols to which a physical downlink shared channel (PDSCH) is mapped;

receiving, using the at least one processor, control information for scheduling the PDSCH, the control information comprising a first information field indicating a starting symbol among the plurality of starting symbols and a second information field indicating a scrambling identity from at least two scrambling identities for a reference signal related to the PDSCH given by the signaling message; and receiving, using the at least one processor, downlink data on the PDSCH based on the starting symbol indicated by the first information field.

2. The method as claimed in claim 1, wherein the signaling message comprises second configuration information comprising the at least two scrambling identities for scrambling of the reference signal.

3. The method as claimed in claim 2, further comprising: identifying the reference signal based on the scrambling identity indicated by the second information field from the at least two scrambling identities.

4. The method as claimed in claim 1, wherein the control information is received via a physical downlink control channel (PDCCH) related to the PDSCH.

5. A method for wireless communication, the method comprising:

transmitting, using at least one processor, a signaling message via higher layer signaling, the signaling message comprising first configuration information related to a plurality of starting symbols to which a physical downlink shared channel (PDSCH) is mapped;

transmitting, using the at least one processor, control information for scheduling the PDSCH, the control information comprising a first information field indicating a starting symbol among the plurality of starting symbols and a second information field indicating a scrambling identity from at least two scrambling identities for a reference signal related to the PDSCH given by the signaling message; and transmitting, using the at least one processor, downlink data on the PDSCH based on the starting symbol indicated by the first information field.

6. The method as claimed in claim 5, wherein the signaling message comprises second configuration information comprising the at least two scrambling identities for scrambling of the reference signal.

7. The method as claimed in claim 6, further comprising: identifying the reference signal based on the scrambling identity indicated by the second information field from the at least two scrambling identities.

8. The method as claimed in claim 5, wherein the control information is transmitted via a physical downlink control channel (PDCCH) related to the PDSCH.

9. An apparatus of a user equipment for wireless communication, the apparatus comprising:
a receiver configured to:
receive a signaling message via higher layer signaling, the signaling message comprising first configuration information related to a plurality of starting symbols to which a physical downlink shared channel (PDSCH) is mapped, receive control information for scheduling the PDSCH, the control information comprising a first information field indicating a starting symbol among the plurality of starting symbols and a second information field indicating a scrambling identity from at least two scrambling identities for a reference signal related to the PDSCH given by the signaling message, and receive downlink data on the PDSCH based on the starting symbol indicated by the first information field; and a controller coupled with the transmitter.

10. The apparatus as claimed in claim 9, wherein the signaling message comprises second configuration information comprising the at least two scrambling identities for scrambling of the reference signal.

11. The apparatus as claimed in claim 10, wherein the controller is configured to identify the reference signal based on the scrambling identity indicated by the second information field from the at least two scrambling identities.

12. The apparatus as claimed in claim 9, wherein the control information is received via a physical downlink control channel (PDCCH) related to the PDSCH.

13. An apparatus of a base station for wireless communication, the apparatus comprising:
a transmitter configured to:
transmit a signaling message via higher layer signaling, the signaling message comprising first configuration information related to a plurality of starting symbols to which a physical downlink shared channel (PDSCH) is mapped, transmit control information for scheduling the PDSCH, the control information comprising a first information field indicating a starting symbol among the plurality of starting symbols and a second information field indicating a scrambling identity from at least two scrambling identities for a reference signal related to the PDSCH given by the signaling message, and transmit downlink data on the PDSCH based on the starting symbol indicated by the first information field; and a controller coupled with the transmitter.

14. The apparatus as claimed in claim 13, wherein the signaling message comprises second configuration information comprising the at least two scrambling identities for scrambling of the reference signal.

15. The apparatus as claimed in claim 14, wherein the controller is configured to identify the reference signal based on the scrambling identity indicated by the second information field from the at least two scrambling identities.

16. The apparatus as claimed in claim 13, wherein the control information is transmitted via a physical downlink control channel (PDCCH) related to the PDSCH.

* * * * *